(12) United States Patent
Kamada et al.

(10) Patent No.: US 10,113,638 B2
(45) Date of Patent: Oct. 30, 2018

(54) CONTROL DEVICE OF AUTOMATIC TRANSMISSION AND METHOD OF CONTROLLING AUTOMATIC TRANSMISSION

(71) Applicant: MAZDA MOTOR CORPORATION, Aki-gun, Hiroshima (JP)

(72) Inventors: Shinya Kamada, Kure (JP); Yasuo Shigenaka, Otake (JP); Motomi Kobayashi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 119 days.

(21) Appl. No.: 15/329,757

(22) PCT Filed: Jul. 24, 2015

(86) PCT No.: PCT/JP2015/003722
§ 371 (c)(1),
(2) Date: Jan. 27, 2017

(87) PCT Pub. No.: WO2016/017131
PCT Pub. Date: Feb. 4, 2016

(65) Prior Publication Data
US 2017/0211689 A1    Jul. 27, 2017

(30) Foreign Application Priority Data

Jul. 28, 2014  (JP) .................................. 2014-153123
Jul. 28, 2014  (JP) .................................. 2014-153125

(51) Int. Cl.
*F16H 61/12*   (2010.01)
*F16H 61/06*   (2006.01)
(Continued)

(52) U.S. Cl.
CPC ........... *F16H 61/061* (2013.01); *F16H 61/08* (2013.01); *F16H 61/12* (2013.01); *B60W 10/06* (2013.01);
(Continued)

(58) Field of Classification Search
None
See application file for complete search history.

(56) References Cited

U.S. PATENT DOCUMENTS

2004/0168435 A1* 9/2004 Ichimura ............... F15B 19/005
                                                    60/403
2004/0249540 A1* 12/2004 Saitou ................... B60W 30/19
                                                    701/51
(Continued)

FOREIGN PATENT DOCUMENTS

JP            4418477 B2    2/2010

OTHER PUBLICATIONS

ISA Japan Patent Office, International Search Report Issued in Application No. PCT/JP2015/003722, dated Oct. 13, 2015, WIPO, 2 pages.

*Primary Examiner* — Justin Holmes
(74) *Attorney, Agent, or Firm* — Alleman Hall Creasman & Tuttle LLP

(57) ABSTRACT

An object of the present invention is, even if an abnormality occurs in an oil pressure circuit of an automatic transmission, to avoid traveling performance deterioration by the abnormality when gear change is performed. The present invention provides a control device of an automatic transmission and a method of controlling the automatic transmission, each of which switches from a normal state to an abnormality diagnosis state at a predetermined change gear ratio to diagnose whether there is an abnormality in an automatic transmission, the normal state being a state where an oil pressure supply portion supplies oil pressure to a (Continued)

predetermined friction engaging element, the abnormality diagnosis state being a state where an abnormality diagnosis oil pressure supply portion including an oil pressure supply passage different from an oil pressure supply passage of the oil pressure supply portion supplies the oil pressure to the predetermined friction engaging element.

20 Claims, 27 Drawing Sheets

(51) Int. Cl.
*F16H 61/08* (2006.01)
*F16H 59/68* (2006.01)
*F16H 61/02* (2006.01)
*F16H 61/686* (2006.01)
*B60W 10/06* (2006.01)

(52) U.S. Cl.
CPC .......... *F16H 59/68* (2013.01); *F16H 61/0206* (2013.01); *F16H 61/065* (2013.01); *F16H 61/686* (2013.01); *F16H 2061/1208* (2013.01); *F16H 2061/1264* (2013.01); *F16H 2200/201* (2013.01)

(56) References Cited

U.S. PATENT DOCUMENTS

| | | | |
|---|---|---|---|
| 2006/0046897 A1* | 3/2006 | Mohlmann | F16H 61/0204 477/143 |
| 2006/0172856 A1* | 8/2006 | Takagi | F16H 61/12 477/127 |
| 2006/0189429 A1* | 8/2006 | Sakamoto | F16H 61/0206 475/116 |
| 2007/0021261 A1* | 1/2007 | Morise | F16H 61/12 475/119 |

* cited by examiner

|  | LOW CLUTCH (40) | HIGH CLUTCH (50) | LR BRAKE (60) | 26 BRAKE (70) | R35 BRAKE (80) |
|---|---|---|---|---|---|
| FIRST GEAR STAGE | ENGAGED |  | ENGAGED |  |  |
| SECOND GEAR STAGE | ENGAGED |  |  | ENGAGED |  |
| THIRD GEAR STAGE | ENGAGED |  |  |  | ENGAGED |
| FOURTH GEAR STAGE | ENGAGED | ENGAGED |  |  |  |
| FIFTH GEAR STAGE |  | ENGAGED |  |  | ENGAGED |
| SIXTH GEAR STAGE |  | ENGAGED |  | ENGAGED |  |
| REVERSE GEAR STAGE |  |  | ENGAGED |  | ENGAGED |

Fig. 2

CONTROL DEVICE OF AUTOMATIC TRANSMISSION AND METHOD OF CONTROLLING AUTOMATIC TRANSMISSION

TECHNICAL FIELD

The present invention relates to control of an automatic transmission mounted on a vehicle and belongs to a field of gear change control technology for vehicles.

BACKGROUND ART

A stepped automatic transmission mounted on a vehicle, such as a car, typically includes: a plurality of planetary gear sets (planetary gear mechanisms); and a plurality of oil pressure friction engaging elements such as clutches and brakes. By selectively engaging the friction engaging elements by control of an oil pressure circuit, power transmission paths passing through the planetary gear sets are switched, and as a result, a plurality of forward gear stages and typically one reverse gear stage can be realized.

The oil pressure circuit of this type of automatic transmission includes: a plurality of switching valves configured to switch oil pressure supply passages; and a plurality of solenoid valves (electromagnetic oil pressure control valves) used to adjust oil pressure or open or close an oil passage. When some sort of abnormality (such as valve stick, coil disconnection, or short circuit) occurs at any of these switching valves and solenoid valves, the supply of the oil pressure to a specific friction engaging element through the abnormal switching valve or solenoid valve may not be performed or may not be stopped. When such abnormality occurs, a gear stage different from a gear stage corresponding to a traveling state is mistakenly realized, so that a traveling performance of the vehicle deteriorates.

As a countermeasure against the abnormality of the oil pressure circuit, PTL 1 discloses control of detecting, while gear change is not performed, an occurrence of interlock based on deceleration of the vehicle and a difference between a gear ratio of a command gear stage determined in accordance with the traveling state and an actual gear ratio, the interlock being caused by engagement of a friction engaging element which should not be engaged. When the occurrence of the interlock is detected, so-called limp home control is executed such that: gear change to a predetermined gear stage is performed for realizing traveling to the extent possible; or switching to a neutral state is performed

CITATION LIST

Patent Literature

PTL 1: Japanese Patent No. 4418477

SUMMARY OF INVENTION

Technical Problem

According to the technology of PTL 1, the interlock which occurs while the gear change is not performed is detected, and the limp home control is performed such that the interlock state is eliminated. Therefore, an abnormality, such as the above-described erroneous gear change, which occurs for the first time when the gear change is performed cannot be avoided by the control of PTL 1.

An object of the present invention is to, even if an abnormality occurs in an oil pressure circuit of an automatic transmission, avoid a case where a traveling performance deteriorates by the abnormality when gear change is performed.

Solution to Problem

To achieve the above object, a control device of an automatic transmission according to the present invention and a method of controlling an automatic transmission according to the present invention are configured as below.

A first aspect of the present invention is a control device of an automatic transmission mounted on a vehicle, the control device comprising: a predetermined friction engaging element; an oil pressure supply portion configured to supply oil pressure to the predetermined friction engaging element at a predetermined change gear ratio; an abnormality diagnosis oil pressure supply portion configured to supply the oil pressure to the predetermined friction engaging element through an oil pressure supply passage that is different from an oil pressure supply passage through which the oil pressure supply portion supplies the oil pressure to the predetermined friction engaging element; and an abnormality diagnosis portion configured to switch from a normal state to an abnormality diagnosis state at the predetermined change gear ratio to diagnose whether or not there is an abnormality in the automatic transmission, the normal state being a state where the oil pressure supply portion supplies the oil pressure to the predetermined friction engaging element, the abnormality diagnosis state being a state where the abnormality diagnosis oil pressure supply portion supplies the oil pressure to the predetermined friction engaging element.

A second aspect of the present invention is configured such that: in the first aspect of the present invention, in a case where the predetermined friction engaging element is maintained in an engaged state when the abnormality diagnosis portion switches from the normal state to abnormality diagnosis state, the abnormality diagnosis portion determines that the automatic transmission is normal; and in a case where the predetermined friction engaging element becomes a released state when the abnormality diagnosis portion switches from the normal state to abnormality diagnosis state, the abnormality diagnosis portion determines that the automatic transmission is abnormal.

A third aspect of the present invention is configured such that in the second aspect of the present invention, the control device further includes a torque reducing portion configured to reduce torque output from a power source of the vehicle to the automatic transmission when the abnormality diagnosis portion performs the diagnosis.

A fourth aspect of the present invention is configured such that in the second or third aspect of the present invention, the abnormality diagnosis oil pressure supply portion is related to supply of the oil pressure to a friction engaging element configured to be engaged at a change gear ratio close to the predetermined change gear ratio.

Herein, the "change gear ratio close to the predetermined change gear ratio" in the case of a stepped transmission denotes a "gear stage adjacent to a gear stage realizing the predetermined change gear ratio," and the "change gear ratio close to the predetermined change gear ratio" in the case of a stepless transmission denotes a "change gear ratio within a predetermined close range around the predetermined change gear ratio."

A fifth aspect of the present invention is configured such that in the fourth aspect of the present invention, the abnormality diagnosis oil pressure supply portion includes a switching valve configured to switch between an oil pressure supply state where the oil pressure is supplied to the friction engaging element configured to be engaged at the change gear ratio close to the predetermined change gear ratio and an oil pressure supply state where the oil pressure is supplied to a friction engaging element configured to be engaged at a change gear ratio different from the predetermined change gear ratio and the change gear ratio close to the predetermined change gear ratio, and therefore, the abnormality diagnosis oil pressure supply portion is related to the supply of the oil pressure to the friction engaging element configured to be engaged at the change gear ratio close to the predetermined change gear ratio.

A sixth aspect of the present invention is configured such that in the fourth aspect of the present invention, the control device further includes: a first friction engaging element configured to be engaged at a first change gear ratio; a second friction engaging element configured to be engaged at a second change gear ratio smaller than the first change gear ratio; an oil pressure control mechanism configured to be selectively switched between a first state and a second state, the first state being a state where the oil pressure is supplied to the first friction engaging element, the second state being a state where the oil pressure is supplied to the second friction engaging element; a confirming portion configured to confirm that the oil pressure control mechanism is in the second state; and a gear change condition setting portion configured to set a condition for shift-up to the second change gear ratio such that when the confirming portion confirms that the oil pressure control mechanism is in the second state, a predetermined normal condition is used as a vehicle speed condition used when performing the shift-up to the second change gear ratio from a third change gear ratio which is higher than the second change gear ratio and at which the first and second friction engaging elements are released, and when the confirming portion does not confirm that the oil pressure control mechanism is in the second state, a low vehicle speed side condition that is set to a low vehicle speed side of the normal condition is used as the vehicle speed condition.

A seventh aspect of the present invention is configured such that: in the sixth aspect of the present invention, the gear change condition setting portion sets the normal condition such that a vehicle speed condition when an acceleration request to the vehicle is larger than a predetermined amount is higher than a vehicle speed condition when the acceleration request is equal to or smaller than the predetermined amount; and the gear change condition setting portion sets the low vehicle speed side condition such that the vehicle speed condition when the acceleration request is larger than the predetermined amount is lower than the vehicle speed condition of the normal condition, and the vehicle speed condition when the acceleration request is equal to or smaller than the predetermined amount is equal to the vehicle speed condition of the normal condition.

An eighth aspect of the present invention is configured such that in the sixth or seventh aspect of the present invention, when the confirming portion confirms that the oil pressure control mechanism is in the second state, and the oil pressure control mechanism is switched from the second state to the first state, the gear change condition setting portion changes the vehicle speed condition from the normal condition to the low vehicle speed side condition.

A ninth aspect of the present invention is configured such that in any one of the sixth to eighth aspects of the present invention, the oil pressure control mechanism includes a switching valve configured to be switched to selectively supply the oil pressure to the first friction engaging element and the second friction engaging element.

A tenth aspect of the present invention is configured such that: in the ninth aspect of the present invention, the oil pressure control mechanism includes an oil pressure control valve provided between the switching valve and an oil pressure source; at the first change gear ratio and the second change gear ratio, the oil pressure control valve allows supply of the oil pressure from the oil pressure source to the switching valve; and at the third change gear ratio, the oil pressure control valve blocks the supply of the oil pressure from the oil pressure source to the switching valve.

An eleventh aspect of the present invention is a method of controlling an automatic transmission, the automatic transmission including: a predetermined friction engaging element; and an oil pressure supply portion configured to supply oil pressure to the predetermined friction engaging element at a predetermined change gear ratio, the method including switching from a normal state to an abnormality diagnosis state at the predetermined change gear ratio to diagnose whether or not there is an abnormality in the automatic transmission, the normal state being a state where the oil pressure supply portion supplies the oil pressure to the predetermined friction engaging element, the abnormality diagnosis state being a state where an abnormality diagnosis oil pressure supply portion including an oil pressure supply passage different from an oil pressure supply passage of the oil pressure supply portion supplies the oil pressure to the predetermined friction engaging element.

A twelfth aspect of the present invention is configured such that in the eleventh aspect of the present invention, the automatic transmission includes: a first friction engaging element configured to be engaged at a first change gear ratio; a second friction engaging element configured to be engaged at a second change gear ratio smaller than the first change gear ratio; and an oil pressure control mechanism configured to be selectively switched between a first state and a second state, the first state being a state where the oil pressure is supplied to the first friction engaging element, the second state being a state where the oil pressure is supplied to the second friction engaging element, the method including: a confirming step of confirming whether or not the oil pressure control mechanism is in the second state; and a gear change condition setting step of setting a condition for shift-up to the second change gear ratio such that when it is confirmed in the confirming step that the oil pressure control mechanism is in the second state, a predetermined normal condition is used as a vehicle speed condition used when performing the shift-up to the second change gear ratio from a third change gear ratio which is higher than the second change gear ratio and at which the first and second friction engaging elements are released, and when it is not confirmed in the confirming step that the oil pressure control mechanism is in the second state, a low vehicle speed side condition that is set to a low vehicle speed side of the normal condition is used as the vehicle speed condition.

Advantageous Effects of Invention

First, in the control device of the automatic transmission according to the first aspect of the present invention, at the predetermined change gear ratio at which the oil pressure supply portion supplies the oil pressure to the predetermined friction engaging element, the normal state where the oil pressure supply portion supplies the oil pressure is switched to the abnormality diagnosis state where the abnormality diagnosis oil pressure supply portion supplies the oil pressure. With this, whether or not there is an abnormality in the oil pressure circuit of the automatic transmission, especially whether or not there is an abnormality in the oil pressure supply passage constituting the abnormality diagnosis oil pressure supply portion can be diagnosed before the gear change.

When it is determined by this diagnosis that there is the abnormality, there is a possibility that there is a malfunction in any component such as the switching valve or oil pressure control valve provided on the oil pressure supply passage of the abnormality diagnosis oil pressure supply portion, and there is also a possibility that the normal gear change cannot be performed by the malfunction. Therefore, when it is determined by the above diagnosis that there is the abnormality, the gear change which may cause the abnormality is restricted, so that the deterioration of the traveling performance by the abnormality of the gear change can be avoided.

According to the second aspect of the present invention, the abnormality of the automatic transmission can be accurately determined by the above diagnosis depending on whether or not the predetermined friction engaging element is released. Further, when the automatic transmission is normal, the engaged state of the predetermined friction engaging element is maintained. With this, the automatic transmission does not become the neutral state, and the traveling state at the predetermined change gear ratio is maintained. Thus, uncomfortable feeling can be prevented from being given to occupants by the execution of the diagnosis.

According to the third aspect of the present invention, when the above diagnosis is performed, the torque output from the power source of the vehicle to the automatic transmission is reduced. Therefore, even if the automatic transmission is abnormal and temporarily becomes the neutral state by the releasing of the predetermined friction engaging element due to the diagnosis, the excessive increase in the revolution of the power source can be suppressed.

According to the fourth aspect of the present invention, by the above diagnosis performed at the predetermined change gear ratio, whether or not there is an abnormality in the oil pressure control mechanism which is related to the supply of the oil pressure to the friction engaging element configured to be engaged at a change gear ratio close to the predetermined change gear ratio can be determined before the gear change to the change gear ratio close to the predetermined change gear ratio is performed. Therefore, when it is determined by the above diagnosis that there is the abnormality, the gear change to the change gear ratio close to the predetermined change gear ratio is restricted, so that the deterioration of the traveling performance by the abnormality of the gear change can be avoided.

According to the fifth aspect of the present invention, whether or not there is an abnormality in the switching valve can be determined by the diagnosis performed at the predetermined change gear ratio. Therefore, when it is determined by the diagnosis that there is the abnormality in the switching valve, the gear change to the change gear ratio close to the predetermined change gear ratio is restricted, so that the erroneous gear change to a different change gear ratio by the malfunction of the switching valve can be avoided. On this account, the excessive rotation of the engine by the erroneous shift-down and the engine stall by the erroneous shift-up can be prevented.

According to the sixth aspect of the present invention, for example, when it is not confirmed during the acceleration of the vehicle that the oil pressure control mechanism can supply the oil pressure to the second friction engaging element, that is, when there is a possibility that the oil pressure control mechanism is abnormal, the command for the shift-up from the third change gear ratio to the second change gear ratio is output earlier than normal at a relatively low vehicle speed. Therefore, even if the shift-down to the first change gear ratio is realized by the abnormality of the oil pressure control mechanism in response to the command for the shift-up to the second change gear ratio, the increase in the engine revolution can be suppressed to a relatively low level, and therefore, the excessive rotation of the engine can be suppressed.

Without performing special abnormality diagnosis control for determining whether or not there is an abnormality in the oil pressure control mechanism, the excessive rotation of the engine can be suppressed by changing the shift-up condition as above. Therefore, even when the shift-up from the first change gear ratio to the second change gear ratio is performed quickly to such a degree that a time for the abnormality diagnosis control cannot be secured, the excessive rotation of the engine can be surely suppressed.

According to the seventh aspect of the present invention, in a case where the acceleration request to the vehicle is larger than the predetermined amount, the command for the shift-up from the third change gear ratio to the second change gear ratio is output when the low vehicle speed side condition is set. With this, even if the above erroneous shift-down is realized, the excessive rotation of the engine can be suppressed. In contrast, in a case where the acceleration request to the vehicle is not larger than the predetermined amount, the excessive rotation of the engine hardly occurs even if the erroneous shift-down is realized. Therefore, the shift-up to the second change gear ratio is performed based on the normal condition, and the normal gear change control can be performed.

According to the eighth aspect of the present invention, in a case where: it is once confirmed that the oil pressure control mechanism is switched from the first state to the second state; the oil pressure control mechanism is returned to the first state thereafter; and whether or not the next switching to the second state is normally performed becomes unclear, the vehicle speed condition when performing the shift-up from the third change gear ratio to the second change gear ratio is returned from the normal condition to the low vehicle speed side condition. With this, the next shift-up to the second change gear ratio is performed at a relatively low vehicle speed. Therefore, at the time of this shift-up, even if the shift-down to the first change gear ratio is mistakenly realized by the abnormality in which the oil pressure control mechanism is not switched to the second state, the excessive rotation of the engine can be suppressed.

According to the ninth aspect of the present invention, in a case where an abnormality by, for example, the valve stick of the switching valve or the malfunction of the oil pressure control valve configured to control the switching valve occurs in the switching operation of the switching valve configured to be switched to selectively supply the oil pressure to the first friction engaging element and the second friction engaging element, the excessive rotation of the engine when the erroneous shift-down is realized can be suppressed.

According to the tenth aspect of the present invention, at the third change gear ratio, the oil pressure is not supplied to any of the first and second friction engaging elements. Therefore, even if there is an abnormality in the operation of the switching valve, it is difficult to detect this abnormality at the third change gear ratio. However, as described above, the command for the shift-up to the second change gear ratio is output under the low vehicle speed side condition until it is confirmed that the switching to the second state is normally performed. Therefore, even if the erroneous shift-down is performed in response to the command for the shift-up, the excessive rotation of the engine can be suppressed. On this account, at the third change gear ratio, it is unnecessary to diagnose in advance by any method whether or not there is a malfunction of the switching valve. Thus, even when the shift-up from the first change gear ratio to the second change gear ratio is performed quickly to such a degree that a time for the diagnosis cannot be secured, the excessive rotation of the engine can be surely suppressed.

In the method of controlling the automatic transmission according to the eleventh aspect of the present invention, at the predetermined change gear ratio at which the oil pressure supply portion supplies the oil pressure to the predetermined friction engaging element, the normal state where the oil pressure supply portion supplies the oil pressure is switched to the abnormality diagnosis state where the abnormality diagnosis oil pressure supply portion supplies the oil pressure. With this, whether or not there is an abnormality in the oil pressure circuit of the automatic transmission, especially whether or not there is an abnormality in the oil pressure supply passage constituting the abnormality diagnosis oil pressure supply portion can be diagnosed before the gear change.

When it is determined by this diagnosis that there is the abnormality, there is a possibility that there is a malfunction in any component such as the switching valve or oil pressure control valve provided on the oil pressure supply passage of the abnormality diagnosis oil pressure supply portion, and there is also a possibility that the normal gear change cannot be performed by the malfunction. Therefore, when it is determined by the above diagnosis that there is the abnormality, the gear change which may cause the abnormality is restricted, so that the deterioration of the traveling performance by the abnormality of the gear change can be avoided.

According to the twelfth aspect of the present invention, for example, when it is not confirmed during the acceleration of the vehicle that the oil pressure control mechanism can supply the oil pressure to the second friction engaging element, that is, when there is a possibility that the oil pressure control mechanism is abnormal, the command for the shift-up from the third change gear ratio to the second change gear ratio is output earlier than normal at a relatively low vehicle speed. Therefore, even if the shift-down to the first change gear ratio is realized by the abnormality of the oil pressure control mechanism in response to the command for the shift-up to the second change gear ratio, the increase in the engine revolution can be suppressed to a relatively low level, and therefore, the excessive rotation of the engine can be suppressed.

Without performing special abnormality diagnosis control for determining whether or not there is an abnormality in the oil pressure control mechanism, the excessive rotation of the engine can be suppressed by changing the shift-up condition as above. Therefore, even when the shift-up from the first change gear ratio to the second change gear ratio is performed quickly to such a degree that a time for the abnormality diagnosis control cannot be secured, the excessive rotation of the engine can be surely suppressed.

BRIEF DESCRIPTION OF DRAWINGS

FIG. 2 is an engagement table showing relations among combinations of engagements of friction engaging elements of the automatic transmission and gear stages.

DESCRIPTION OF EMBODIMENTS

Hereinafter, embodiments of the present invention will be explained.

Embodiment 1

First, an automatic transmission according to Embodiment 1 will be explained.

Configuration of Automatic Transmission

Figure 1:
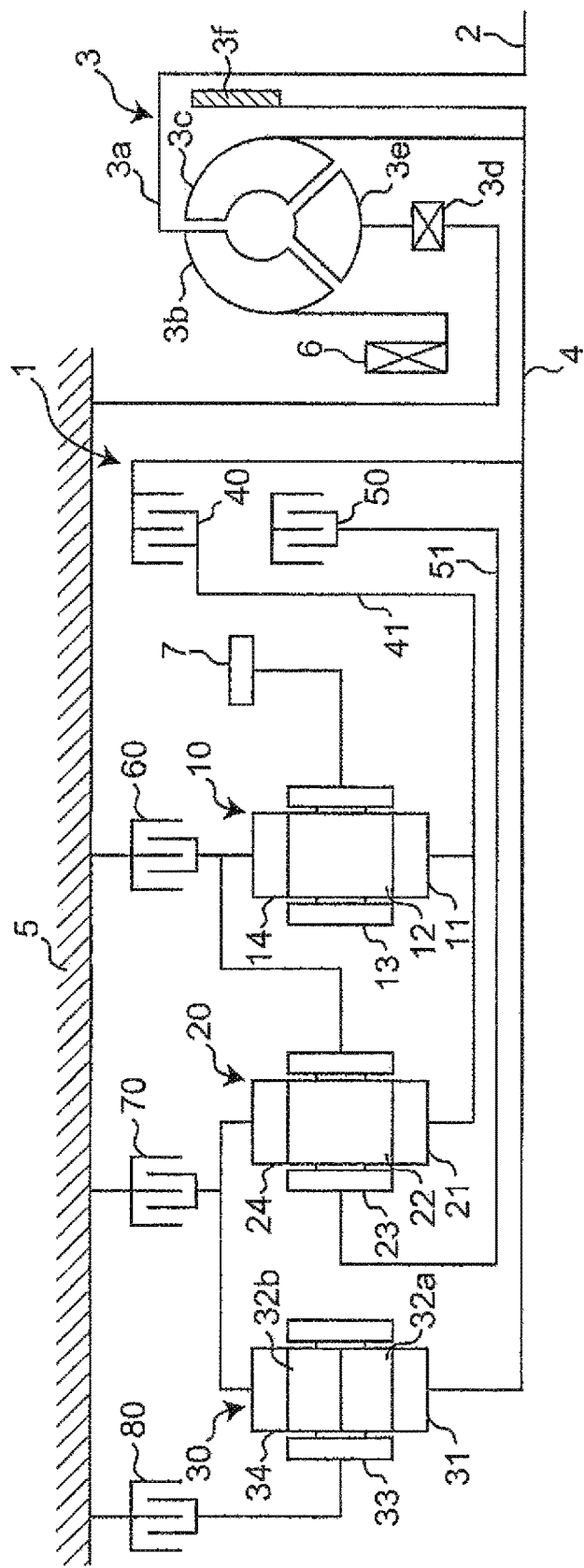
FIG. 1 is a schematic diagram showing an automatic transmission according to Embodiment 1 of the present invention.

As schematically shown in FIG. 1, an automatic transmission 1 according to Embodiment 1 of the present invention includes an input shaft 4 coupled to an engine output shaft 2 through a torque converter 3.

The torque converter 3 includes: a case 3a coupled to the engine output shaft 2; a pump 3b fixedly provided in the case 3a; a turbine 3c provided opposite to the pump 3b and driven by the pump 3b through operating oil; a stator 3e interposed between the pump 3b and the turbine 3c and supported by a transmission case 5 through a one-way clutch 3d to perform a torque increasing action; and a lock-up clutch 3f provided between the case 3a and the turbine 3c and directly coupling the engine output shaft 2 and the turbine 3c through the case 3a. The rotation of the turbine 3c is transmitted to the automatic transmission 1 through the input shaft 4.

A mechanical oil pump 6 driven by an engine through the torque converter 3 is arranged between the automatic transmission 1 and the torque converter 3. While the engine is driving, the oil pump 6 supplies oil pressure to a below-described oil pressure circuit 100 (see FIG. 4) used to control the automatic transmission 1 and the torque converter 3.

First, second, and third planetary gear sets (hereinafter referred to as "first, second, and third gear sets") 10, 20, and 30 are arranged on the input shaft 4 of the automatic transmission 1 in this order from a driving source side (the torque converter 3 side).

As friction engaging elements for switching power transmission paths constituted by the gear sets 10, 20, and 30, low and high clutches 40 and 50 configured to selectively transmit power from the input shaft 4 to the gear sets 10, 20, and 30 are arranged on the input shaft 4. In addition, a LR (low reverse) brake 60, a 26 brake 70, and a R35 brake 80, which fix predetermined rotational elements of the gear sets 10, 20, and 30, are arranged on the input shaft 4 in this order from the driving source side.

Among the first to third gear sets 10 to 30, the first gear set 10 and the second gear set 20 are single pinion type planetary gear sets. The first gear set 10 is constituted by: a sun gear 11; a plurality of pinions 12 which mesh with the sun gear 11; a carrier 13 which supports the pinions 12; and a ring gear 14 which meshes with the pinions 12. The second gear set 20 is constituted by: a sun gear 21; a plurality of pinions 22 which mesh with the sun gear 21; a carrier 23 which supports the pinions 22; and a ring gear 24 which meshes with the pinions 22.

The third gear set 30 is a double pinion type planetary gear set. The third gear set 30 is constituted by: a sun gear 31; a plurality of first pinions 32a which mesh with the sun gear 31; a second pinion 32b which meshes with the first pinions 32a; a carrier 33 which supports the pinions 32a and 32b; and a ring gear 34 which meshes with the second pinion 32b.

The input shaft 4 is directly coupled to the sun gear 31 of the third gear set 30. The sun gear 11 of the first gear set 10 and the sun gear 21 of the second gear set 20 are coupled to each other and are also coupled to an output member 41 of the low clutch 40. An output member 51 of the high clutch 50 is coupled to the carrier 23 of the second gear set 20.

The ring gear 14 of the first gear set 10 and the carrier 23 of the second gear set 20 are coupled to each other and are also coupled to the transmission case 5 through an LR brake 60 so as to be connectable to and disconnectable from the transmission case 5. The ring gear 24 of the second gear set 20 and the ring gear 34 of the third gear set 30 are coupled to each other and are also coupled to the transmission case 5 through the 26 brake 70 so as to be connectable to and disconnectable from the transmission case 5. The carrier 33 of the third gear set 30 is coupled to the transmission case 5 through the R35 brake 80 so as to be connectable to and disconnectable from the transmission case 5. An output gear 7 configured to output an output of the automatic transmission 1 to a driving wheel (not shown) is coupled to the carrier 13 of the first gear set 10.

With the above configuration, the automatic transmission 1 forms the first to sixth gear stages in a D range and a reverse gear stage in an R range as shown in the engagement table of FIG. 2 by the combinations of engaged states of the friction engaging elements (the low clutch 40, the high clutch 50, the LR brake 60, the 26 brake 70, and the R35 brake 80). In FIG. 2, "engaged" denotes engagement, and a blank denotes release. For example, at the first gear stage, the low clutch 40 and the LR brake 60 shown by "engaged" are engaged, and the high clutch 50, the 26 brake 70, and the R35 brake 80 shown by blanks are released.

Control System of Automatic Transmission

Figure 3:
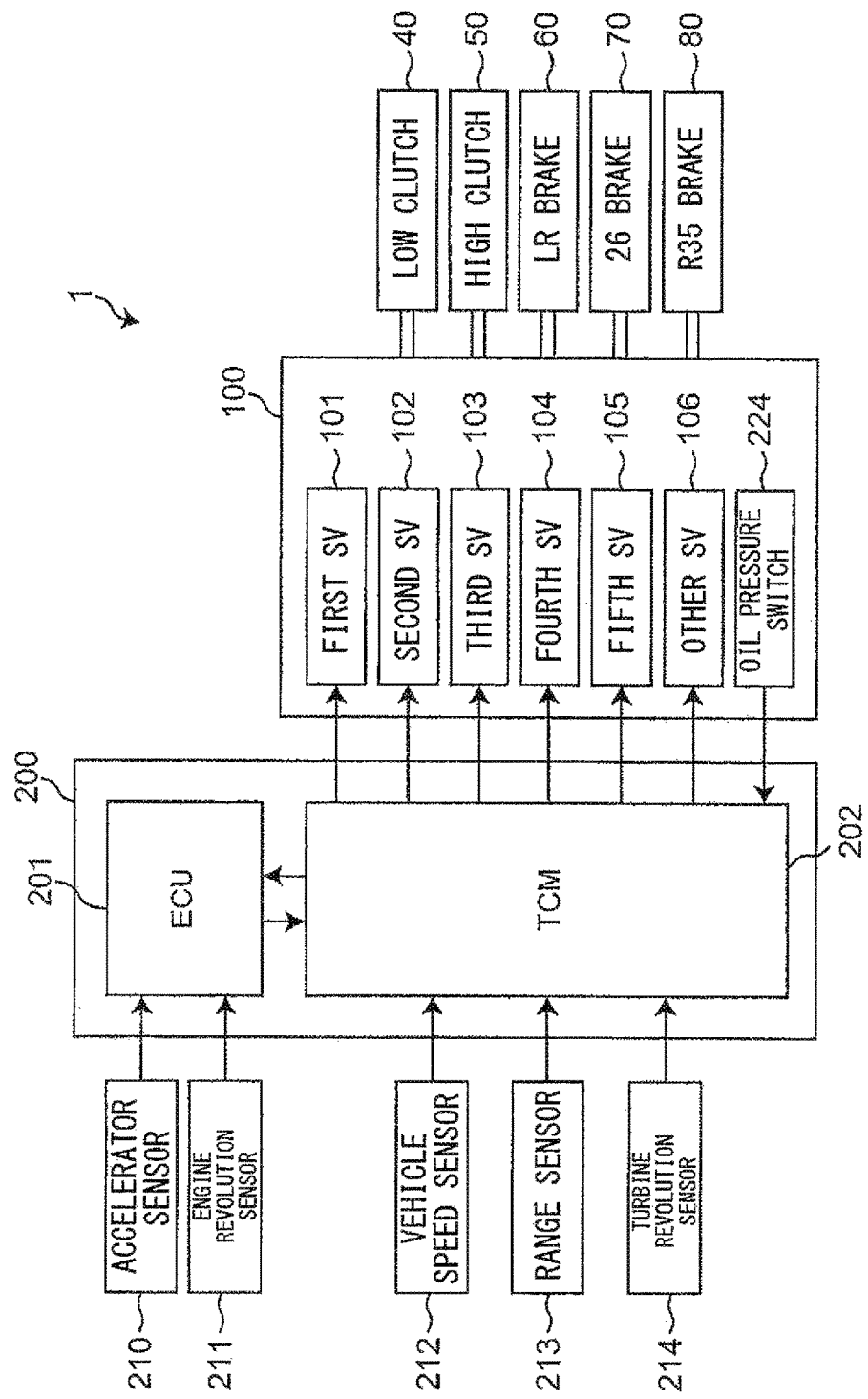
FIG. 3 is a control system diagram showing the automatic transmission according to Embodiment 1.

As shown in FIG. 3, the automatic transmission 1 includes the oil pressure circuit 100 configured to selectively supply line pressure for engagement to the friction engaging elements 40, 50, 60, 70, and 80 to realize the gear stage.

The oil pressure circuit 100 includes: first, second, third, fourth, and fifth solenoid valves (hereinafter, the "solenoid valve" may be referred to as a "SV") 101, 102, 103, 104, and 105 for gear change control; and other SVs, such as a plurality of SVs 106. The first SV 101 is an on/off solenoid valve capable of controlling only opening or closing thereof. The second to fifth SVs 102 to 105 are linear solenoid valves each capable of controlling an opening degree thereof. Further, the oil pressure circuit 100 is provided with an oil pressure switch 224 configured to detect the engaged state or released state of the R35 brake 80.

The SVs 101 to 106 of the oil pressure circuit 100 are controlled by a control device 200. The control device 200 includes: an ECU (Engine Control Unit) 201 mounted on the engine; and a TCM (Transmission Control Module) 202 mounted on the automatic transmission 1. The ECU 201 and the TCM 202 are electrically connected to each other through, for example, CAN communication.

The ECU 201 receives signals from an accelerator sensor 210, an engine revolution sensor 211, etc. As an acceleration request to the vehicle, the accelerator sensor 210 detects a step-on amount (accelerator opening degree) of an accelerator pedal. The engine revolution sensor 211 detects the revolution of the engine. Based on the input signals, the ECU 201 performs various control, such as control of an output torque of the engine, regarding the operation of the engine.

The TCM 202 receives: a signal from a vehicle speed sensor 212 configured to detect the speed of the vehicle on which the automatic transmission 1 is mounted; a signal from a range sensor 213 configured to detect the range of the automatic transmission 1, the range being selected by a driver; a signal from a turbine revolution sensor 214 configured to detect the revolution of the turbine 3c of the torque converter 3; and a signal from the oil pressure switch 224 provided at the oil pressure circuit 100. Further, the TCM 202 receives: a signal from the accelerator sensor 210 through the ECU 201; and a signal from the engine revolution sensor 211.

Based on the input signals, the TCM 202 outputs signals to the SVs 101 to 106 of the oil pressure circuit 100. With this, the opening/closing or opening degree of each of the SVs 101 to 106 is controlled in accordance with the selected range and a traveling state of the vehicle, so that the supply of the oil pressure to each of the friction engaging elements 40, 50, 60, 70, and 80 is controlled. Thus, the gear change control of the automatic transmission 1 is performed. Further, in accordance with a situation of the gear change control, the TCM 202 outputs various command signals regarding the operation of the engine, such as the output torque of the engine, to the ECU 201.

Oil Pressure Circuit

Figure 4:
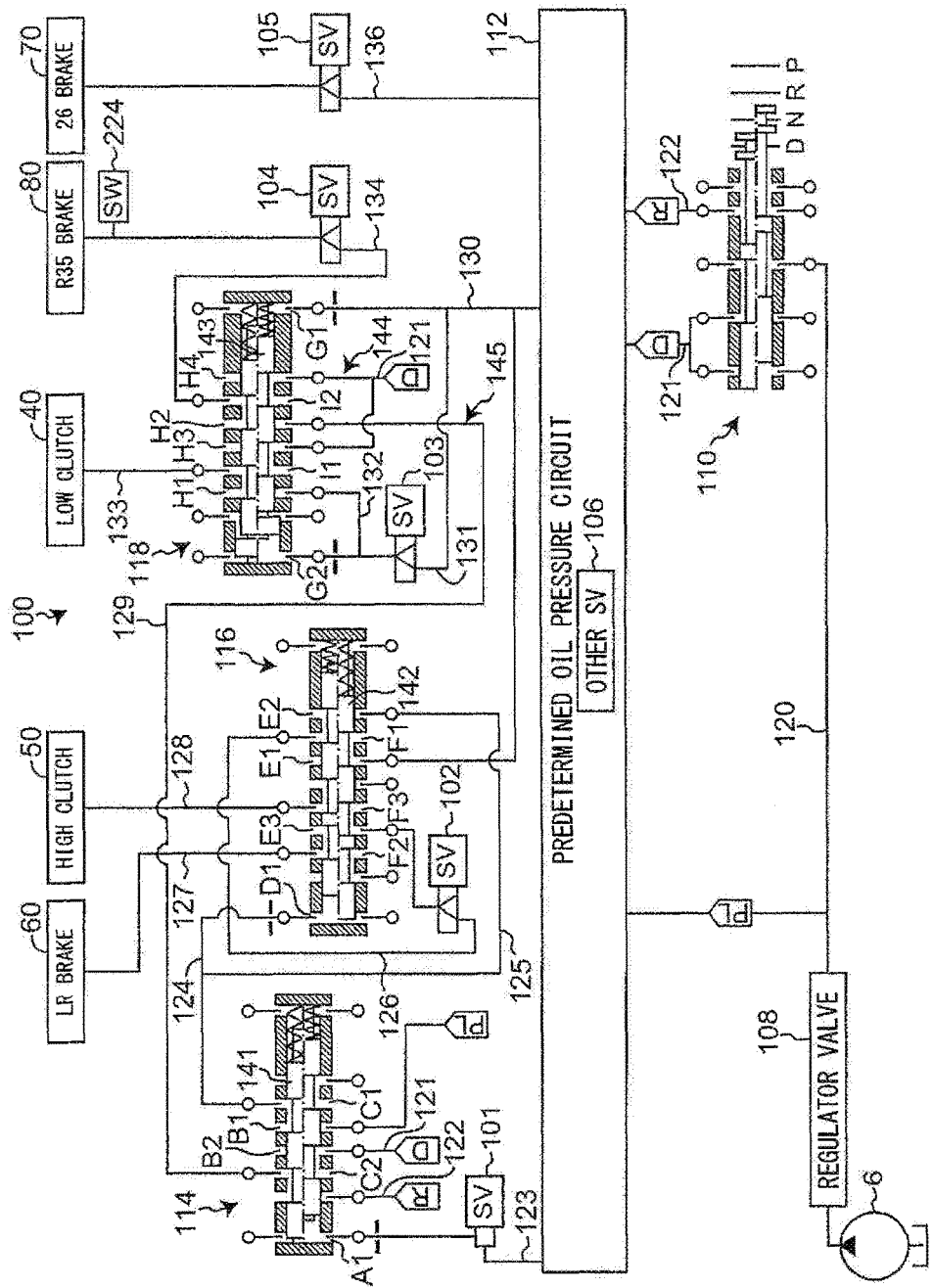
FIG. 4 is a circuit diagram showing an oil pressure circuit of the automatic transmission.

The configuration of the oil pressure circuit 100 will be explained in reference to FIG. 4.

In addition to the SVs 101 to 106 and the oil pressure switch 224, the oil pressure circuit 100 includes: a regulator valve 108 configured to regulate discharge pressure of the oil pump 6 to line pressure and supply the pressure to a main line 120; a manual valve 110 configured to operate by a range selecting operation of the driver; a predetermined oil pressure circuit 112 provided with various valves including the other SVs 106; a first switching valve 114 controlled by the first SV 101; a second switching valve 116 controlled by the first switching valve 114; and a third switching valve 118 controlled by the third SV 103. Although not shown, the oil pressure circuit 100 is also provided with a circuit for the supply of the operating oil of the torque converter 3 and the control of the lock-up clutch 3f.

When the manual valve 110 is located at an operation position of the D range, the line pressure of the main line 120 is output to a D range line 121. When the manual valve 110 is located at an operation position of the R range, the line pressure of the main line 120 is output to an R range line 122.

The first switching valve 114 is switched between a first state and a second state. The first state denotes a state where a spool 141 is being moved to a left side since the supply of the oil pressure from the predetermined oil pressure circuit 112 through the line 123 to a control port A1 is stopped by the on/off control of the first SV 101 provided on a line 123. The second state denotes a state where the spool 141 is being moved to a right side since the oil pressure is supplied from the predetermined oil pressure circuit 112 to the control port A1 by the on/off control of the first SV 101 provided on a line 123. In the first state of the first switching valve 114, the line pressure input to an input port B1 is output from an output port C1 to a line 124. In the second state of the first switching valve 114, the oil pressure of the D range line 121 which pressure is input to an input port B2 when the D range is being selected is output from an output port C2 to a line 129.

The second switching valve 116 is switched between a first state and a second state. The first state denotes a state where a spool 142 is being moved to the right side since the oil pressure is supplied from the line 124 to a control port D1 by switching control of the first switching valve 114, the switching control being performed by the first SV 101. The second state denotes a state where the spool 142 is being moved to the left side since the supply of the oil pressure from the line 124 to the control port D1 is stopped by the switching control of the first switching valve 114, the switching control being performed by the first SV 101.

In the first state of the second switching valve 116, the oil pressure of a line 125 branching from the line 124 is input from an input port E2 and is once output from an output port F1 to a line 126. When the oil pressure of the line 126 is input to an input port E3 by the control of the second SV 102 provided on the line 126, it is output from an output port F2 to a line 127 to be supplied to the LR brake 60.

In the second state of the second switching valve 116, the oil pressure input from the predetermined oil pressure circuit 112 to an input port E1 is once output from the output port F1 to the line 126, and when the oil pressure of the line 126 is input to the input port E3 by the control of the second SV 102, the oil pressure is output from an output port F3 to a line 128 to be supplied to the high clutch 50.

The third switching valve 118 includes: a first control port G1 to which the oil pressure is supplied from the predetermined oil pressure circuit 112 through a line 130; and a second control port G2 to which the oil pressure of a line 131 branching from the line 130 is supplied. The third SV 103 is provided on the line 131, and the oil pressure of the line 131 is regulated by controlling the opening degree of the third SV 103. The third switching valve 118 is switched between a first state and a second state. The first state denotes a state where a spool 143 is being moved to the left side since the oil pressure input from the line 131 to the second control port G2 is reduced by reducing the opening degree of the third SV 103. The second state denotes a state where the spool 143 is being moved to the right side since the oil pressure of the line 131 which pressure is input to the second control port G2 is increased by increasing the opening degree of the third SV 103.

In the first state of the third switching valve 118, when the oil pressure is supplied from the first switching valve 114 through the line 129 to an input port H2, it is output from an output port I2 to a line 134 and can be supplied to the R35 brake 80 by the control of the fourth SV 104 provided on the line 134.

In the first state of the third switching valve 118, when the line 131 is being closed by the third SV 103, the oil pressure of a line 132 branching from the line 131 is not input to an input port H1, so that the supply of the oil pressure from an output port I1 through a line 133 to the low clutch 40 is not performed. On the other hand, even in the first state of the third switching valve 118, by controlling the opening degree of the third SV 103, the oil pressure of the line 131 can be maintained at high pressure to some extent while being reduced to such an extent that the spool 143 is moved to the left side. In this case, since the oil pressure of the line 132 is input from the input port H1 and output from the output port I1, the oil pressure can be supplied through the line 133 to the low clutch 40.

In the second state of the third switching valve 118, the oil pressure of the D range line 121 is input to two input ports H3 and H4. The oil pressure input to the input port H3 is output from the output port I1 to be supplied to the low clutch 40. The oil pressure input to the input port H4 is output from the output port I2 and can be supplied to the R35 brake 80 by the control of the fourth SV 104.

The oil pressure switch 224 is provided on the line 134 directly coupled to the R35 brake 80. The oil pressure switch 224 can detect the engaged or released state of the R35 brake 80.

As described above, the engaging and releasing control of the LR brake 60 and the high clutch 50 are performed directly by the switching control of the second switching valve 116 or the control of the opening degree of the second SV 102, and the control of the second switching valve 116 is performed by the control of switching the first switching valve 114 by the first SV 101. Further, the engaging and releasing control of the low clutch 40 are performed by: the control of switching the third switching valve 118 by the third SV 103; or controlling the opening degree of the third SV 103 when the third switching valve 118 is in the first state. The engaging and releasing control of the R35 brake 80 is performed by the control of switching the third switching valve 118 by the third SV 103 and the control of the opening degree of the fourth SV 104. Further, the engaging and releasing control of the 26 brake 70 are performed directly by controlling the opening degree of the fifth SV 105 provided on a line 136 connecting the predetermined oil pressure circuit 112 and the 26 brake 70.

The gear change control is performed so as to realize the gear stages in accordance with the engagement table of FIG. 2 in such a manner that the engaging and releasing control of the friction engaging elements 40, 50, 60, 70, and 80 are performed as above.

Figure 5:
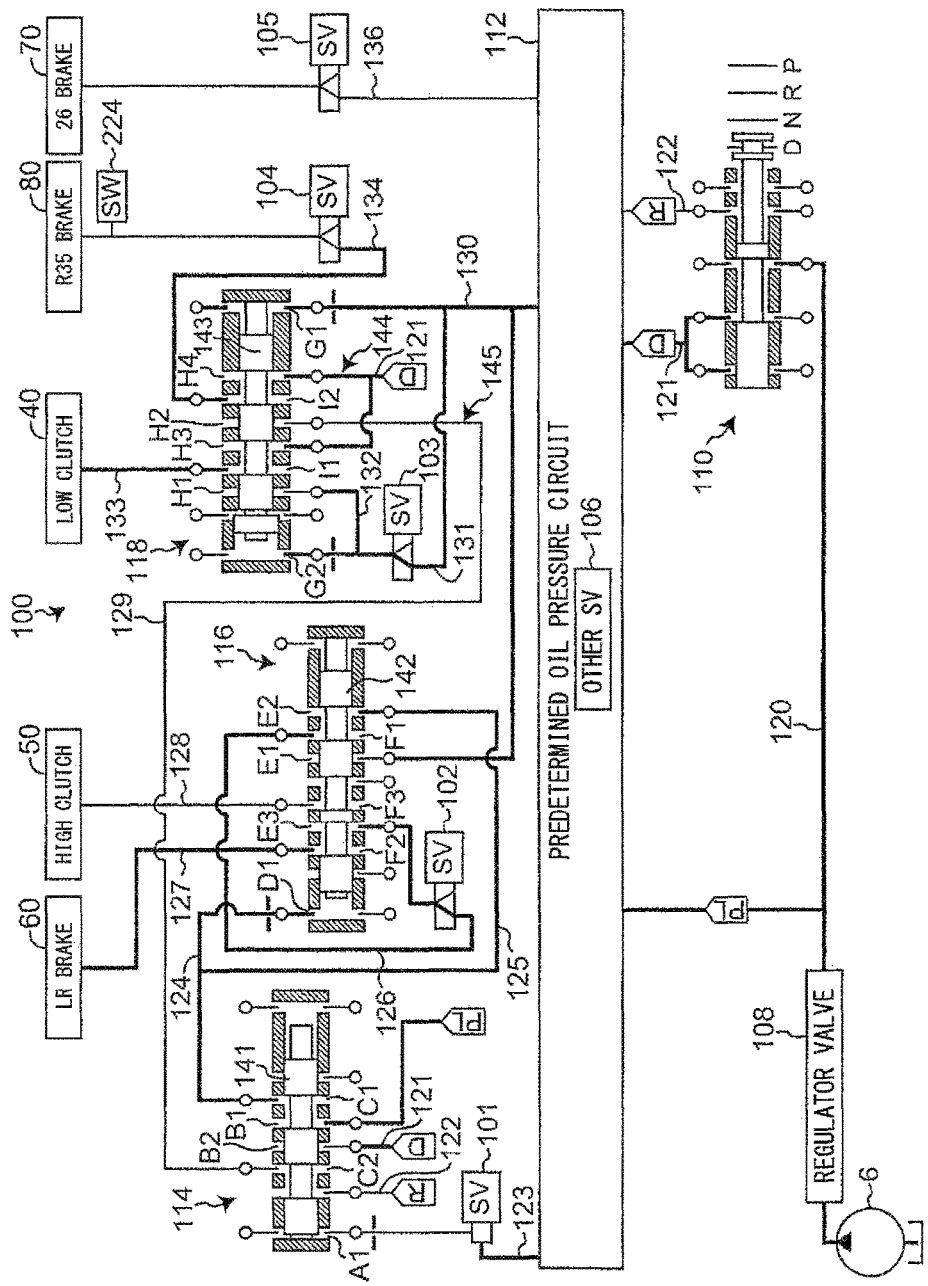
FIG. 5 is a circuit diagram showing the oil pressure circuit at a first gear stage.

FIG. 5 shows an oil pressure supply state of the oil pressure circuit 100 at the first gear stage. At the first gear stage, the first SV 101 is being closed, and the first switching valve 114 is in the first state where the spool 141 is being moved to the left side. With this, the second switching valve 116 becomes the first state where the spool 142 is being moved to the right side, and the high clutch 50 is released. Further, at the first gear stage, the supply of the oil pressure to the input port E3 of the second switching valve 116 is performed by the second SV 102, so that the LR brake 60 is engaged. Furthermore, at the first gear stage, by increasing the opening degree of the third SV 103, the third switching valve 118 is in the second state where the spool 143 is being moved to the right side, and the low clutch 40 is engaged. It should be noted that at the first gear stage, the fourth SV 104 is being closed, so that the R35 brake 80 is being released.

Figure 6:
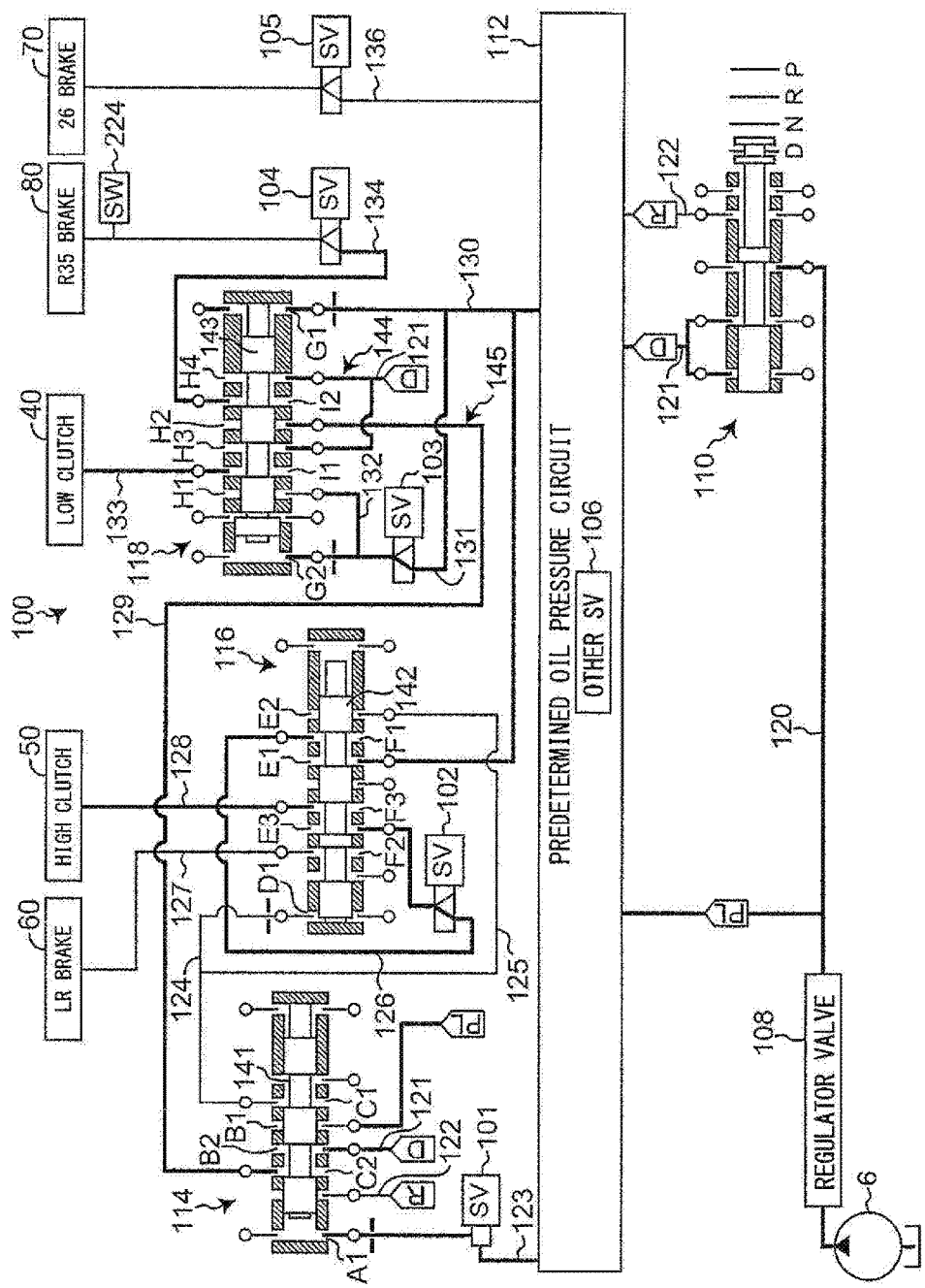
FIG. 6 is a circuit diagram showing the oil pressure circuit at a fourth gear stage.

FIG. 6 shows the oil pressure supply state of the oil pressure circuit 100 at the fourth gear stage. At the fourth gear stage, by opening the first SV 101, the first switching valve 114 becomes the second state where the spool 141 is being moved to the right side. With this, the second switching valve 116 becomes the second state where the spool 142 is being moved to the left side, and the LR brake 60 is released. Further, at the fourth gear stage, the supply of the oil pressure to the input port E3 of the second switching valve 116 is performed by the second SV 102, so that the high clutch 50 is engaged. Furthermore, at the fourth gear stage, as with the first gear stage, the third switching valve 118 is in the second state where the spool 143 is being moved to the right side, and the low clutch 40 is engaged. Then, as with the first gear stage, the R35 brake 80 becomes the released state.

According to a comparison between the first gear stage shown in FIG. 5 and the fourth gear stage shown in FIG. 6, the state of the third switching valve 118 for engaging the low clutch 40 is the same therebetween, but the states of the first switching valve 114 and second switching valve 116 for selectively engaging any of the LR brake 60 and the high clutch 50 are different therebetween.

The second switching valve 116 is directly coupled to both the LR brake 60 and the high clutch 50 and is configured to selectively cause the line 127 connected to the LR brake 60 and the line 128 connected to the high clutch 50 to communicate with the oil pump 6. To be specific, the second switching valve 116 also serves as a valve configured to directly control the engaged or released state of each of both the friction engaging elements 50 and 60.

When the D range is being selected, the LR brake 60 is engaged only at the first gear stage and is released at the second gear stage or higher. On the other hand, the high clutch 50 is engaged at the fourth to sixth gear stages and is released at the first to third gear stages. Therefore, the high clutch 50 and the LR brake 60 are not engaged at the second and third gear stages, so that the switching control of the second switching valve 116 for the purpose of engaging the LR brake 60 for shift-down to the first gear stage or engaging the high clutch 50 for shift-up to the fourth gear stage can be performed in advance at the second and third gear stages with time to spare. Therefore, even when the second switching valve 116 is used for the engaging and releasing control of the friction engaging elements 50 and 60, the engaging and releasing control can be performed without hindrance.

There may be a case where an abnormality occurs, such as a valve stick in which the spool 141 of the first switching valve 114 or the spool 142 of the second switching valve 116 is moved to and fixed at the left or right side or a malfunction of the first SV 101 by coil disconnection, short-circuit, or the like. In such a case, there are problems that: although a command of the first gear stage is being output, the second switching valve 116 becomes the second state, and therefore, the high clutch 50 is engaged instead of the LR brake 60, and thus, the fourth gear stage is realized; and although a command of the fourth gear stage is being output, the second switching valve 116 becomes the first state, and therefore, the LR brake 60 is engaged instead of the high clutch 50, and thus, the first gear stage is realized. In the case of the abnormality in which the fourth gear stage is realized in a low vehicle speed state in which the command of the first gear stage is output, engine stall may occur. In the case of the abnormality in which the first gear stage is realized in a high vehicle speed state in which the command of the fourth gear stage is output, the engine may rotate excessively.

Abnormality Diagnosis Control

To prevent the gear change that impairs the traveling performance, when a predetermined condition is satisfied at the third gear stage, the TCM 202 executes abnormality diagnosis control for diagnosing whether or not the abnormality of the oil pressure circuit 100 of the automatic transmission 1 is present. It should be noted that the third gear stage in the present embodiment corresponds to a "predetermined change gear ratio" in claims.

Hereinafter, Examples 1 and 2 will be explained as specific examples of the abnormality diagnosis control.

Example 1

The abnormality diagnosis control according to Example 1 will be explained in reference to FIGS. 7 to 11.

Figure 7:
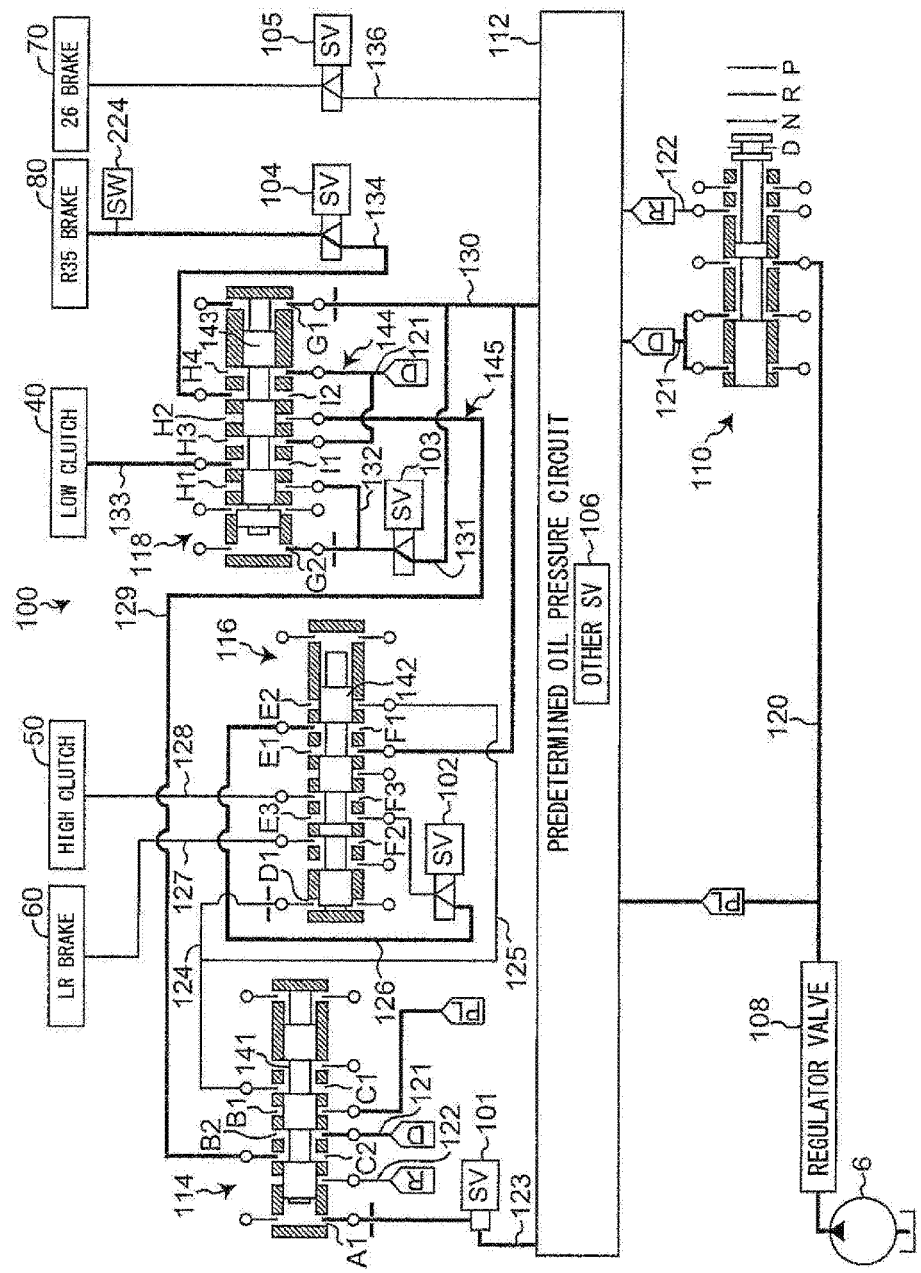
FIG. 7 is a circuit diagram showing the oil pressure circuit at a third gear stage.

The abnormality diagnosis control according to Example 1 is executed at a predetermined timing after the shift-up to the third gear stage is completed. As shown in FIG. 7, in the case of performing the shift-up to the third gear stage, the third switching valve 118 is maintained in the second state continuously from before the shift-up to the third gear stage is performed. With this, the engaged state of the low clutch 40 is maintained. Further, at this time, the fourth SV 104 is opened, so that the R35 brake 80 is newly engaged. The supply of engagement oil pressure to the R35 brake 80 is performed by a normal oil pressure supply portion 144 including an oil pressure supply passage extending through the D range line 121, the input port H4, and the output port 12.

Further, at the second gear stage or the third gear stage, a fourth gear stage preparation operation for the shift-up to the fourth gear stage, which shift-up may be executed after the shift-up to the third gear stage, is executed. In the fourth gear stage preparation operation, the switching control of the first switching valve 114 is performed by the first SV 101. With this, each of the first switching valve 114 and the second switching valve 116 is switched from the first state to the second state. At this time, when the first SV 101 and the first switching valve 114 are normally operating, the oil pressure of the line 129 which pressure is output from the output port C2 of the first switching valve 114 is input to the input port H2 of the third switching valve 118. It should be noted that the fourth gear stage of the present embodiment corresponds to a "change gear ratio close to the predetermined change gear ratio" in claims.

The diagnosis by the abnormality diagnosis control according to Example 1 is performed in a state where the shift-up to the third gear stage and the fourth gear stage preparation operation are completed.

Figure 8:
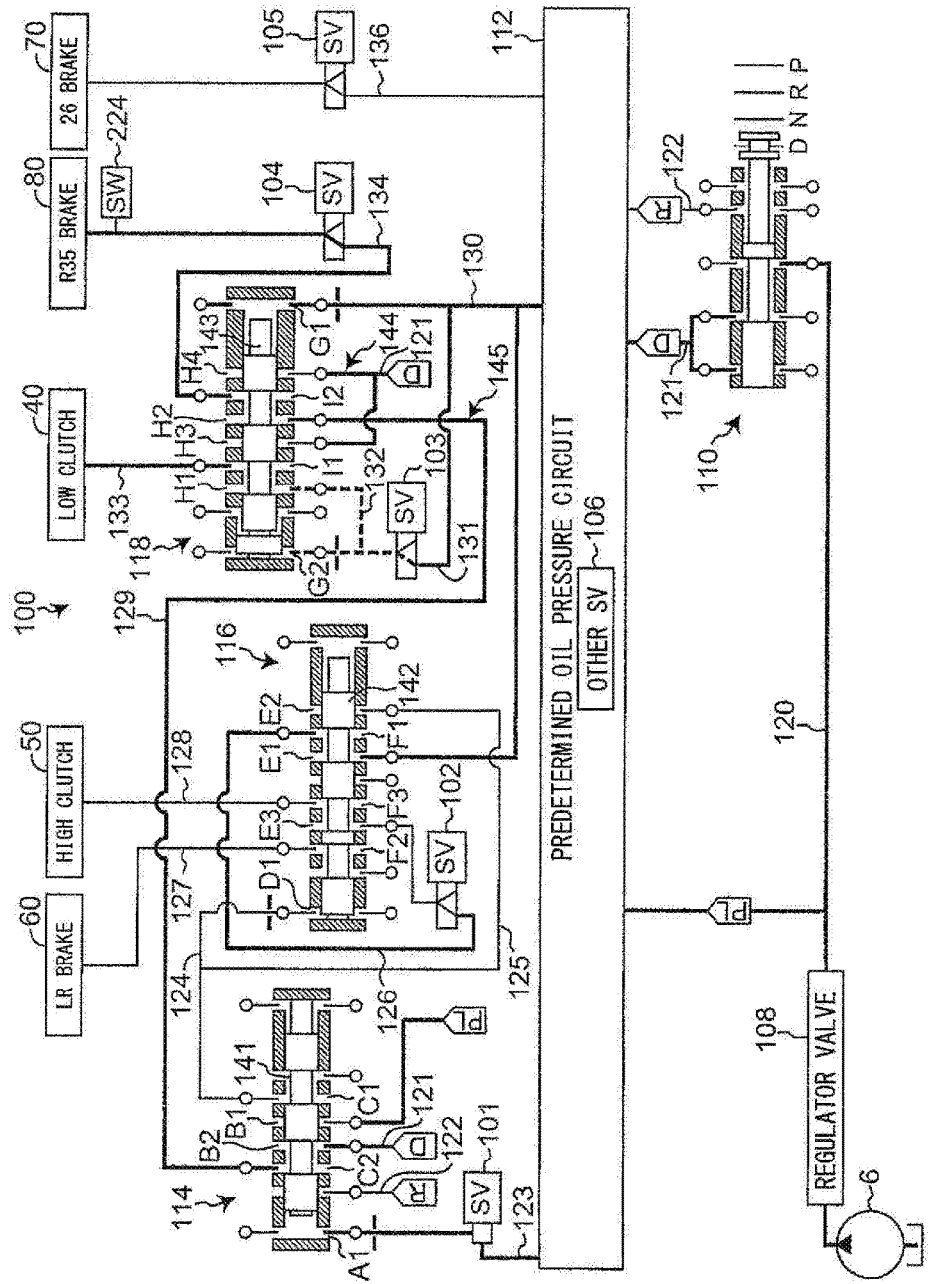
FIG. 8 is a circuit diagram showing the oil pressure circuit in a normal state when diagnosis by abnormality diagnosis control according to Example 1 is executed.

FIG. 8 shows a state where the diagnosis by the abnormality diagnosis control has been executed. In this diagnosis, the third switching valve 118 is switched from the second state to the first state by reducing the opening degree of the third SV 103. At this time, the third SV 103 is slightly closed such that the oil pressure of the line 132 is maintained high to some extent. With this, even when the oil pressure supply passage to the low clutch 40 is switched to a passage extending through the line 132, the engaged state of the low clutch 40 is maintained.

When the third switching valve 118 is switched to the first state by the execution of the diagnosis, the input port H4 is closed, so that the normal oil pressure supply portion 144 cannot supply the engagement oil pressure to the R35 brake 80. However, if the oil pressure circuit 100 of the automatic transmission 1 has no abnormality at this time, the oil pressure of the line 129 is being input to the input port H2 of the third switching valve 118 as described above, so that the engagement oil pressure is supplied to the R35 brake 80 by an abnormality diagnosis oil pressure supply portion 145 including an oil pressure supply passage extending through the line 121, the first switching valve 114, the line 129, the input port H2, and the output port 12. Therefore, if the engaged state of the R35 brake 80 is maintained even when the third switching valve 118 is switched to the first state by the execution of the diagnosis, it can be determined that the automatic transmission 1 is normal.

Figure 9:
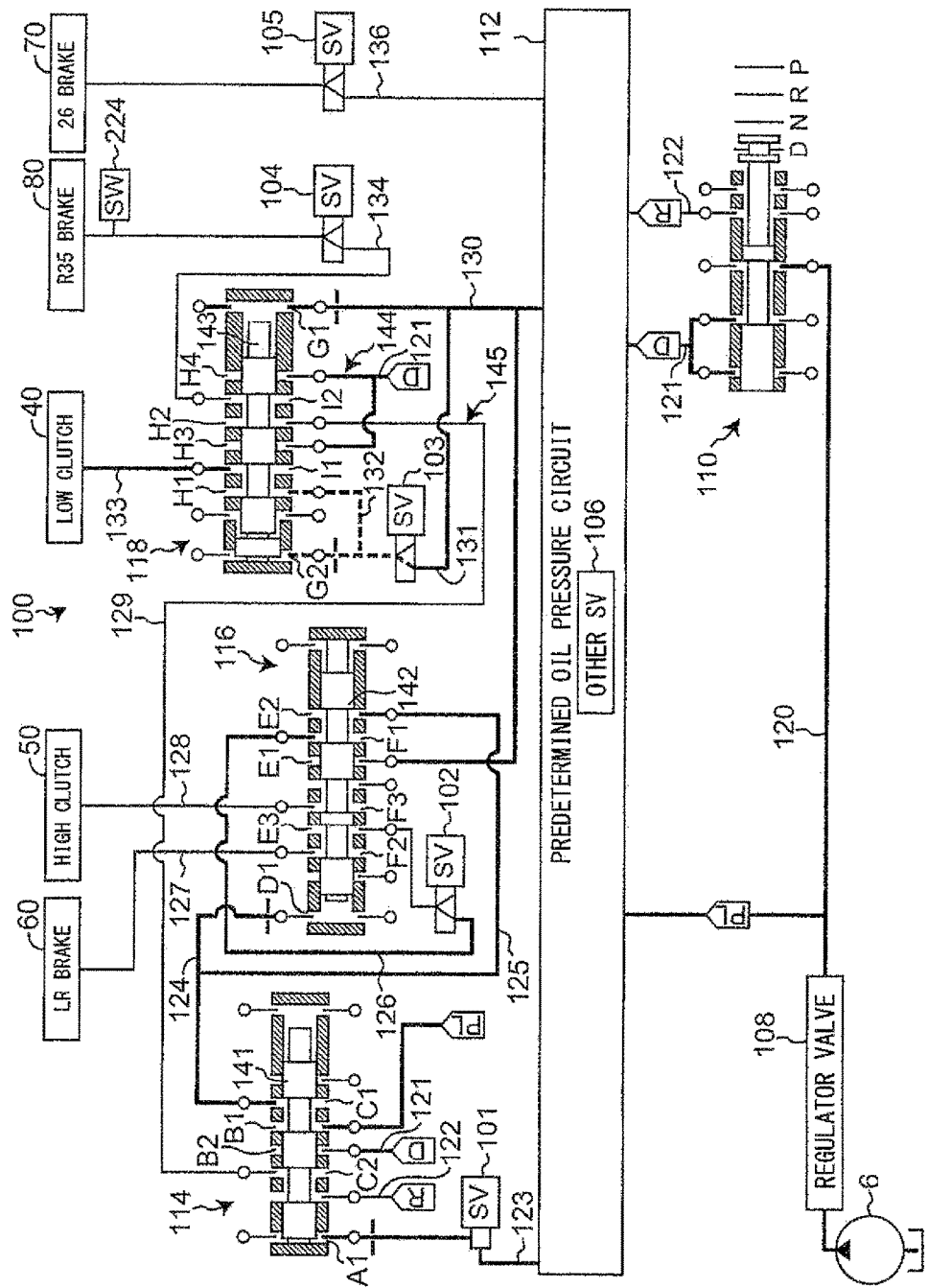
FIG. 9 is a circuit diagram showing the oil pressure circuit in an abnormal state when the diagnosis by the abnormality diagnosis control according to Example 1 is executed.

On the other hand, as shown in FIG. 9, there is a case where the diagnosis is executed when the oil pressure of the line 129 is not input to the input port H2 of the third switching valve 118 because of the malfunction of the first switching valve 114 which malfunction is caused by, for example, the valve stick. In this case, when the third switching valve 118 is switched to the first state by the execution of the diagnosis, the engagement oil pressure cannot be supplied to the R35 brake 80 by any of the normal oil pressure supply portion 144 and the abnormality diagnosis oil pressure supply portion 145. Therefore, when the R35 brake 80 becomes the released state by the execution of the diagnosis, it can be determined that the automatic transmission 1 is abnormal.

Figure 10:
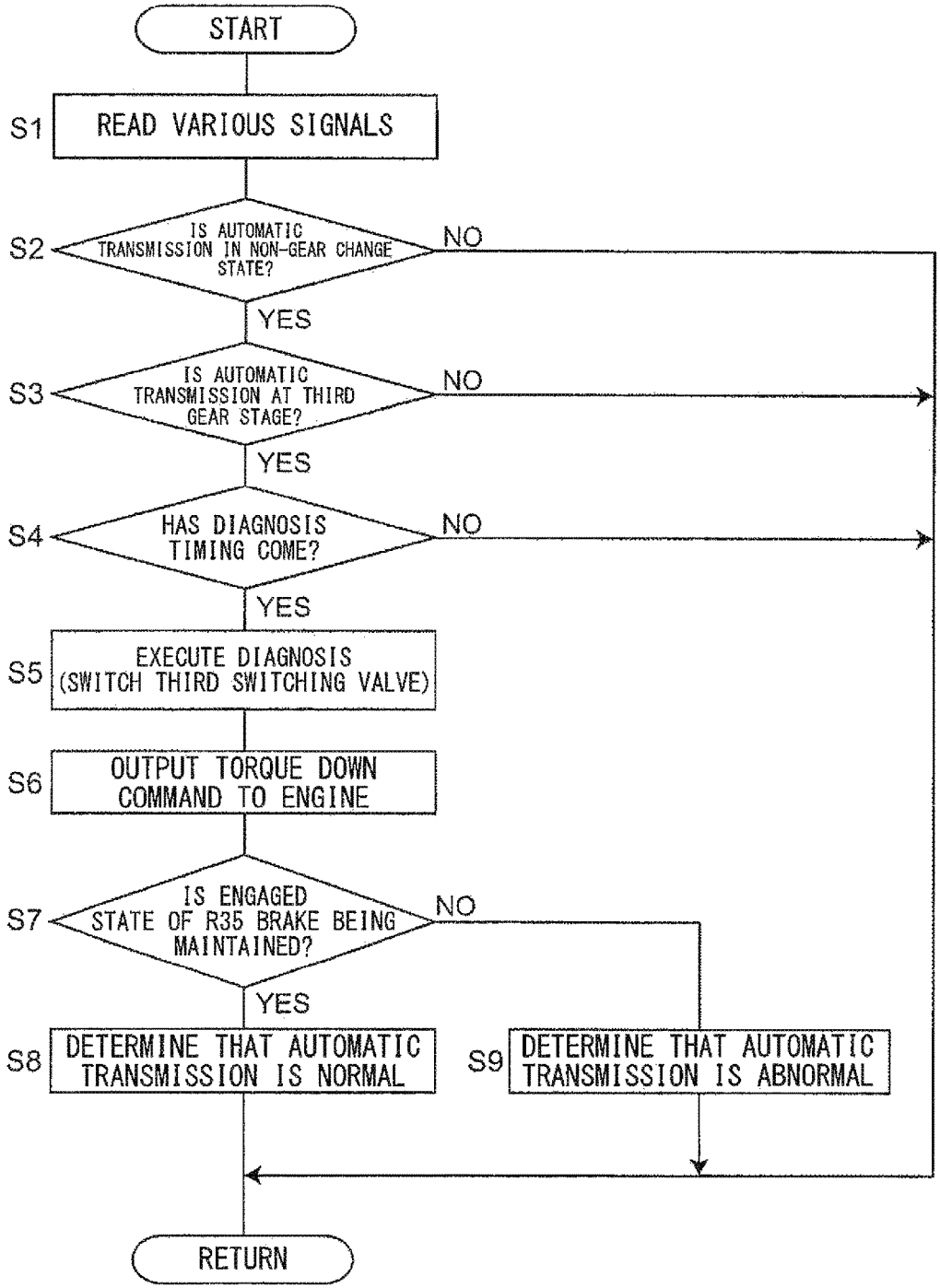
FIG. 10 is a flow chart showing one example of control operations of the abnormality diagnosis control according to Example 1.

FIG. 10 is a flow chart showing one example of control operations of the abnormality diagnosis control according to Example 1. The control operations shown in FIG. 10 are repeatedly executed by the TCM 202 while the vehicle is traveling forward.

According to the control operations shown in FIG. 10, first, in Step S1, the input signals from the sensors 210 to 214 and the oil pressure switch 224 are read.

Next, whether or not the automatic transmission 1 is in a non-gear change state, whether or not the automatic transmission 1 is at the third gear stage, and whether or not a predetermined diagnosis timing has come are determined in Steps S2 to S4, respectively, based on the input signals read in Step S1.

Specifically, in Step S2, whether or not the gear change is not being executed is determined. The determination in Step S2 is performed based on a situation of the gear change control performed by the TCM 202 itself.

In Step S3, whether or not the third gear stage is being realized is determined. The determination in Step S3 is performed based on, for example, whether or not the supply of the engagement oil pressure to the R35 brake 80 which should be engaged at the third gear stage has been detected by the oil pressure switch 224.

In Step S4, whether or not a predetermined timing at which the diagnosis should be executed has come is determined. The "predetermined timing" is set in advance as a timing at which the diagnosis is executed and is set to a timing at which the shift-up to the third gear stage and the fourth gear stage preparation operation are completed. Specifically, in a case where the fourth gear stage preparation operation is executed at the second gear stage, the predetermined timing is set to, for example, a timing at which a predetermined time has elapsed since the start or completion of the shift-up to the third gear stage. Further, in a case where the fourth gear stage preparation operation is executed after the shift-up to the third gear stage, the predetermined time is set to a timing at which a predetermined time has elapsed since the fourth gear stage preparation operation is executed.

As a result of the determinations in Steps S2 to S4, the diagnosis in Step S5 is executed only when the predetermined diagnosis timing has come at the third gear stage while the gear change is not being performed. When the diagnosis in Step S5 is executed, the third switching valve 118 is switched from the second state to the first state by reducing the opening degree of the third SV 103 as described above. In the diagnosis in Step S5, the third switching valve 118 is maintained in the first state for a predetermined diagnosis time. When the diagnosis time elapses, the opening degree of the third SV 103 is controlled to be increased to a size that is equal to the opening degree before the diagnosis, and the third switching valve 118 is returned from the first state to the second state. It is preferable that the diagnosis time in Step S5 be set to a minimum time in which whether or not there is an abnormality in the oil pressure circuit 100 can be accurately determined.

Together with the diagnosis in Step S5, in Step S6, a command for reducing the output torque of the engine by a predetermined amount is output to the ECU 201. Based on this command from the TCM 202, the ECU 201 reduces a throttle opening degree to reduce the output torque of the engine. The torque down command in Step S6 is continuously output while the diagnosis in Step S5 is being performed. With this, if the oil pressure circuit 100 is abnormal, and when the R35 brake 80 is released by the switching control of the third switching valve 118 in the diagnosis in Step S5, and the automatic transmission 1 becomes a neutral state, excessive increases in the engine revolution and the turbine revolution can be suppressed.

Next, in Step S7, whether or not the engaged state of the R35 brake 80 is being maintained is determined. The determination in Step S7 is performed based on, for example, the detection result of the oil pressure switch 224 immediately before the third switching valve 118 which has been switched to the first state is returned to the second state in the diagnosis in Step S5. It should be noted that a specific method for the determination in Step S7 is not especially limited, and the determination in Step S7 may be performed based on a change in the turbine revolution.

As a result of the determination in Step S7, when the engaged state of the R35 brake 80 is maintained, it is determined that the automatic transmission 1 is normal (Step S8), and when the R35 brake 80 is released, it is determined that the automatic transmission 1 is abnormal (Step S9). The abnormality of the automatic transmission 1 determined by this diagnosis is specifically the abnormality of the abnormality diagnosis oil pressure supply portion 145, especially the malfunction of the first switching valve 114.

When the abnormality diagnosis oil pressure supply portion 145 is abnormal, the high clutch 50 cannot be engaged by switching the second switching valve 116 to the second state, so that the fourth to sixth gear stages cannot be realized (see the engagement table of FIG. 2). Therefore, when it is determined in Step S9 that there is an abnormality, the abnormality of the gear change control is informed to occupants by warning light or the like. In addition, in the subsequent gear change control, limp home control in which the gear change to the fourth to sixth gear stages is inhibited is performed.

As above, according to Example 1, since the abnormality diagnosis control is performed at the third gear stage, whether or not there is an abnormality which hinders the adjacent fourth gear stage from being realized can be determined before the shift-up to the fourth gear stage is performed. On this account, the erroneous gear change to the first gear stage can be avoided, the erroneous gear change being caused since the LR brake 60 is engaged by the malfunction of the second switching valve 116 when the command for the shift-up to the fourth gear stage is output, and therefore, the excessive rotation of the engine by the erroneous gear change can be avoided.

Further, according to Example 1, when the diagnosis by the abnormality diagnosis control is executed at the third gear stage, and the automatic transmission 1 is normal, the automatic transmission 1 does not become the neutral state, and the third gear stage is maintained. Therefore, the gear change control can be continued without giving uncomfortable feeling to the occupants. Even when the automatic transmission 1 is abnormal, the traveling performance is maintained since the interlock of the automatic transmission 1 is avoided, and uncomfortable feeling caused since the automatic transmission 1 temporarily becomes the neutral state is suppressed by the reduction in the engine torque (Step S6).

Figure 11:
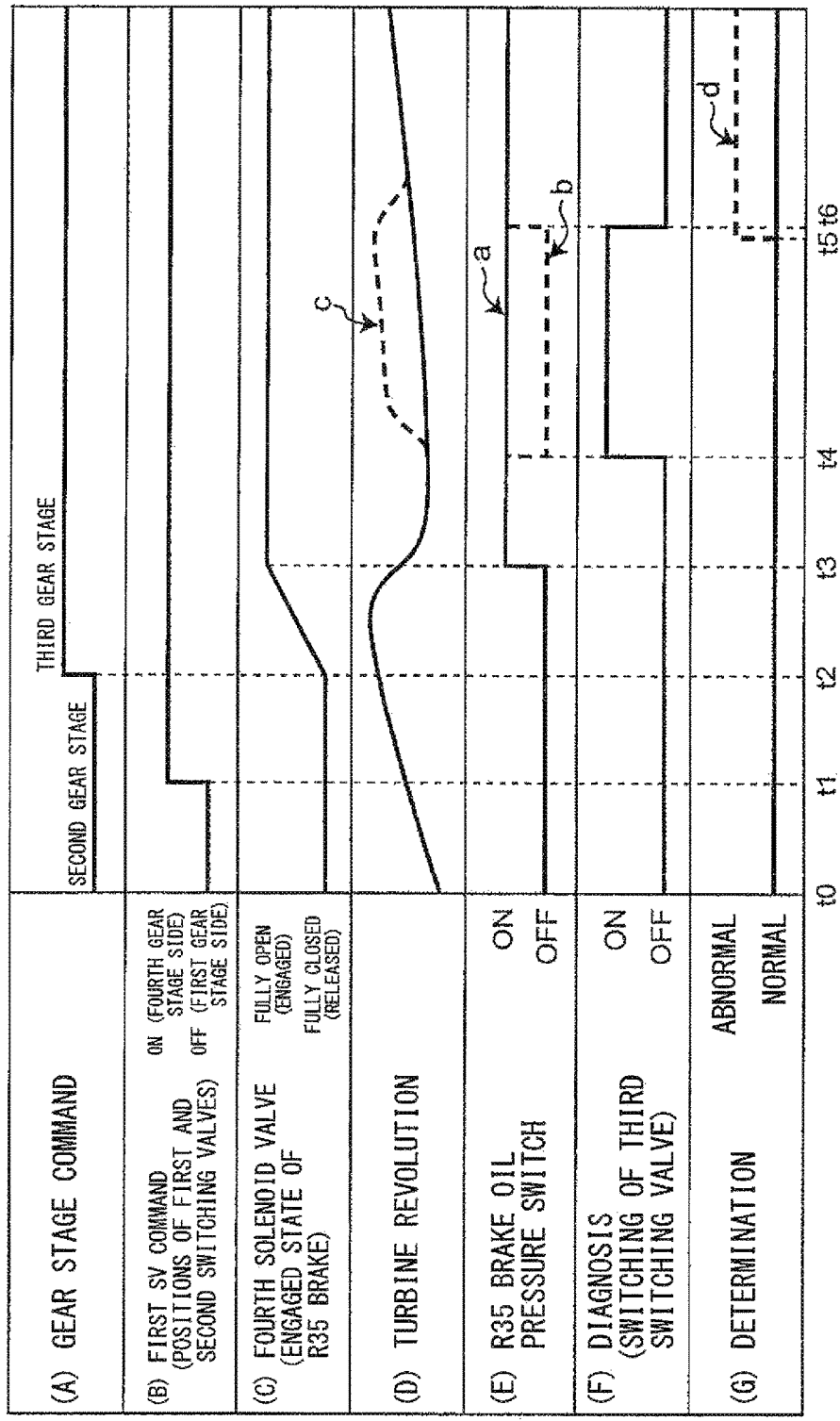
FIG. 11 is a time chart showing one example of temporal changes of respective components when the abnormality diagnosis control according to Example 1 is performed.

FIG. 11 is a time chart showing one example of temporal changes of respective components when the control operations shown in FIG. 10 are performed.

At a time point t0 shown in FIG. 11, the automatic transmission 1 is at the second gear stage. At a predetermined timing t1 at which the automatic transmission 1 is at the second gear stage, as the fourth gear stage preparation operation, the first switching valve 114 is switched from the first state to the second state by turning on the first SV 101. Then, by the shift-up to the third gear stage in a period from a time point t2 to a time point t3, the fourth SV 104 is opened, and with this, the R35 brake 80 is engaged. After that, in a period from a time point t4 to a time point t6, the diagnosis of the abnormality diagnosis control (Step S5 in FIG. 10) is executed. At a time point t5 immediately before the diagnosis terminates, whether or not there is an abnormality is determined.

When the oil pressure circuit 100 is normal, as shown by "a" in FIG. 11, the engaged state of the R35 brake 80 is maintained during the diagnosis. In contrast, when the oil pressure circuit 100 is abnormal, as shown by "b" in FIG. 11, the R35 brake 80 is released, and the automatic transmission 1 becomes the neutral state, and as shown by "c" in FIG. 11, the turbine revolution increases, and as shown by "d", it is determined that there is an abnormality. In this case, the increase in the turbine revolution is suppressed by the torque down command (Step S6 in FIG. 10) output to the ECU 201 together with the execution of the diagnosis. Therefore, uncomfortable feeling of the occupants can be suppressed.

The control example explained in Example 1 is just one example, and various modifications, deletions, and additions regarding the order of the control operations and specific details of the operations may be made.

For example, in Example 1, the abnormality diagnosis control does not necessarily have to be performed after the fourth gear stage preparation operation is completed. The fourth gear stage preparation operation may be performed after the abnormality diagnosis control is performed at the third gear stage. In this case, when performing the abnormality diagnosis control, each of the first switching valve 114 and the second switching valve 116 is in the first state. Therefore, the diagnosis is performed in a state where the oil pressure of the line 129 is not being input to the input port H2 of the third switching valve 118. On this account, in this case, when the R35 brake 80 is released by the execution of the diagnosis, it is determined that the automatic transmission 1 is normal, and when the engaged state of the R35 brake 80 is maintained by the execution of the diagnosis, it is determined that the automatic transmission 1 is abnormal.

Example 2

The abnormality diagnosis control according to Example 2 will be explained in reference to FIGS. 12 to 16.

Figure 12:
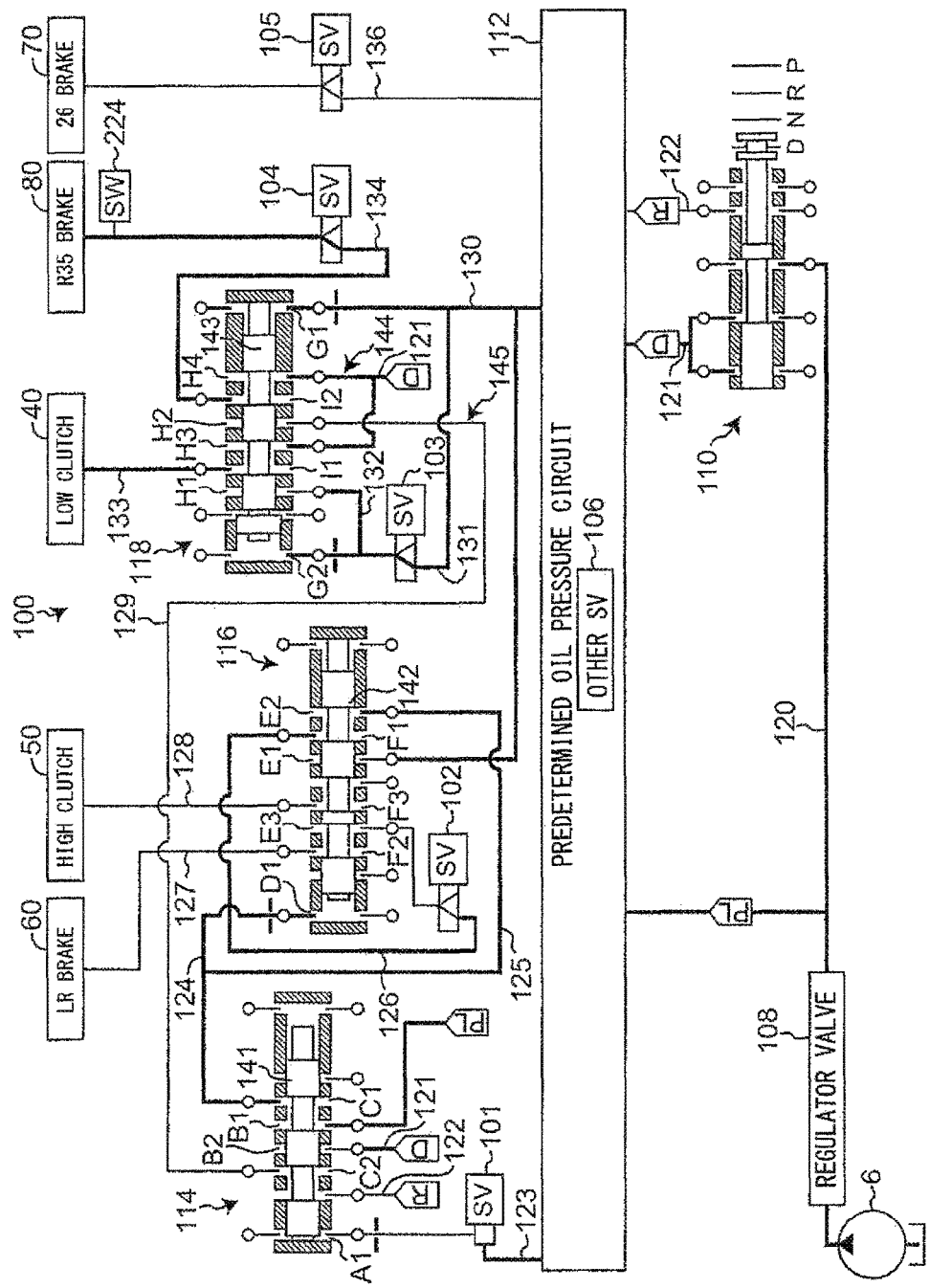
FIG. 12 is a circuit diagram showing the oil pressure circuit when shift-down to the third gear stage is completed.

The abnormality diagnosis control according to Example 2 is executed at a predetermined timing after the shift-down to the third gear stage is completed. As shown in FIG. 12, in the case of performing the shift-down to the third gear stage, the third switching valve 118 is maintained in the second state continuously from before the shift-down to the third gear stage is performed. With this, the engaged state of the low clutch 40 is maintained. Further, at this time, the fourth SV 104 is opened, so that the R35 brake 80 is newly engaged. The supply of the engagement oil pressure to the R35 brake 80 is performed by the normal oil pressure supply portion 144 including the oil pressure supply passage extending through the D range line 121, the input port H4, and the output port 12.

Further, at the third gear stage, a first gear stage preparation operation for the shift-down to the first gear stage, which shift-down may be executed after the shift-down to the third gear stage and the second gear stage, is executed. In the first gear stage preparation operation, by turning off the first SV 101, each of the first switching valve 114 and the second switching valve 116 is switched from the second state to the first state. At this time, when the first SV 101 and the first switching valve 114 are normally operating, the oil pressure is not output from the output port C2 of the first switching valve 114, and therefore, the oil pressure is not input to the input port H2 of the third switching valve 118 connected to the output port C2 through the line 129.

The diagnosis by the abnormality diagnosis control according to Example 2 is performed in a state where the shift-down to the third gear stage and the first gear stage preparation operation are completed.

Figure 13:
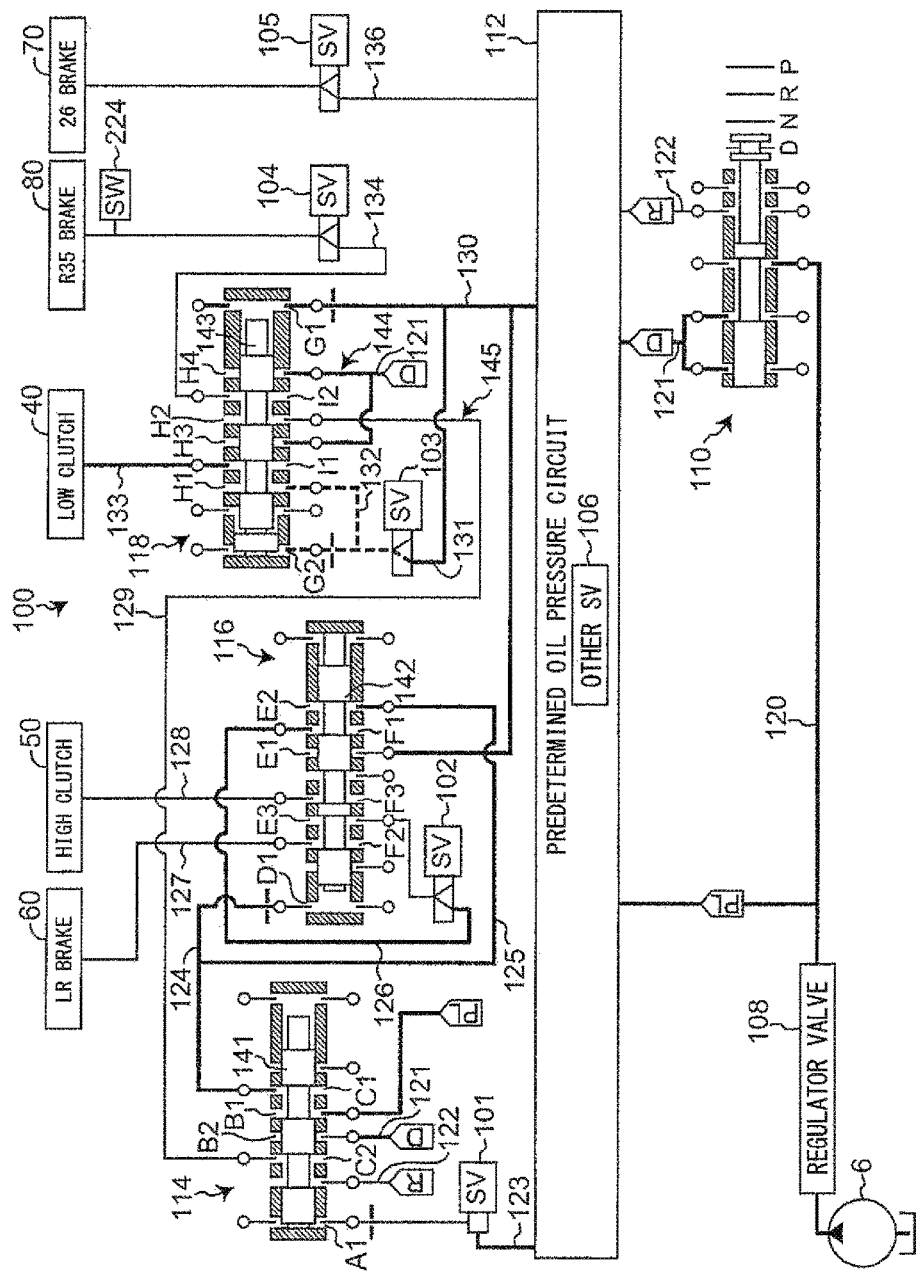
FIG. 13 is a circuit diagram showing the oil pressure circuit in the normal state when the diagnosis by the abnormality diagnosis control according to Example 2 is executed.

FIG. 13 shows a state where the diagnosis by the abnormality diagnosis control has been executed. In this diagnosis, the third switching valve 118 is switched from the second state to the first state by reducing the opening degree of the third SV 103. At this time, the third SV 103 is slightly closed such that the oil pressure of the line 132 is maintained high to some extent. With this, even when the oil pressure supply passage to the low clutch 40 is switched to a passage extending through the line 132, the engaged state of the low clutch 40 is maintained.

When the third switching valve 118 is switched to the first state by the execution of the diagnosis, the input port H4 is closed, so that the normal oil pressure supply portion 144 cannot supply the engagement oil pressure to the R35 brake 80. Further, if the oil pressure circuit 100 of the automatic transmission 1 has no abnormality at this time, the oil pressure of the line 129 is not input to the input port H2 of the third switching valve 118 unlike the above case, so that the engagement oil pressure cannot be supplied to the R35 brake 80 even by the abnormality diagnosis oil pressure supply portion 145 including the oil pressure supply passage extending through the line 123, the first switching valve 114, the line 129, the input port H2, and the output port 12. Therefore, if the R35 brake 80 is released when the third switching valve 118 is switched to the first state by the execution of the diagnosis, it can be determined that the automatic transmission 1 is normal.

Figure 14:
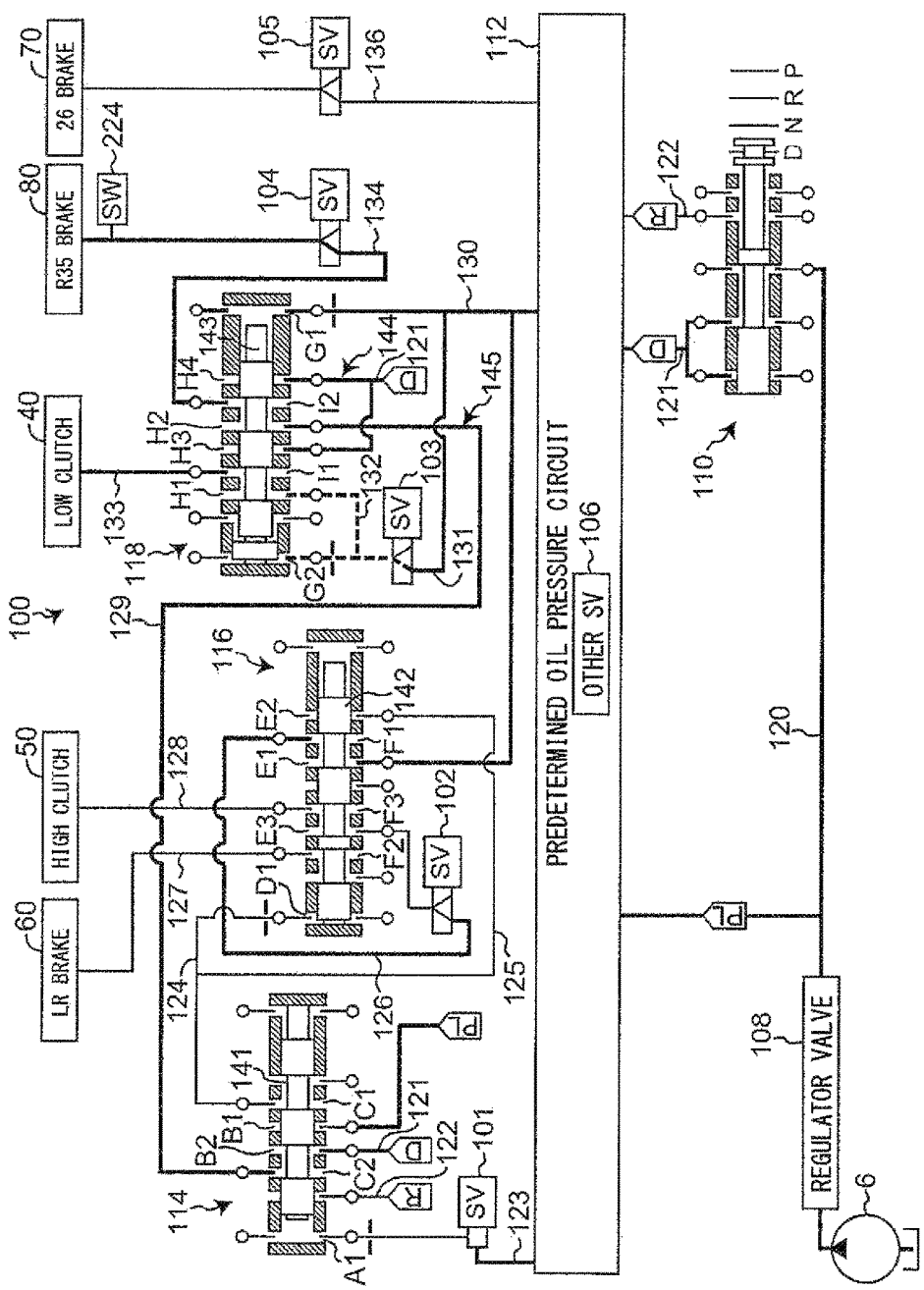
FIG. 14 is a circuit diagram showing the oil pressure circuit in the abnormal state when the diagnosis by the abnormality diagnosis control according to Example 2 is executed.

On the other hand, as shown in FIG. 14, in a case where the first switching valve 114 is fixed in the second state by the malfunction caused by the valve stick or the like, the diagnosis is performed in a state where the oil pressure output from the output port C2 of the first switching valve 114 to the line 129 is being input to the input port H2 of the third switching valve 118. Therefore, when the third switching valve 118 is switched to the first state by the execution of the diagnosis, the supply of the oil pressure to the R35 brake 80 cannot be performed by the normal oil pressure supply portion 144 but can be performed by the abnormality diagnosis oil pressure supply portion 145. Therefore, when the engaged state of the R35 brake 80 is maintained by the execution of the diagnosis, it can be determined that the automatic transmission 1 is abnormal.

Figure 15:
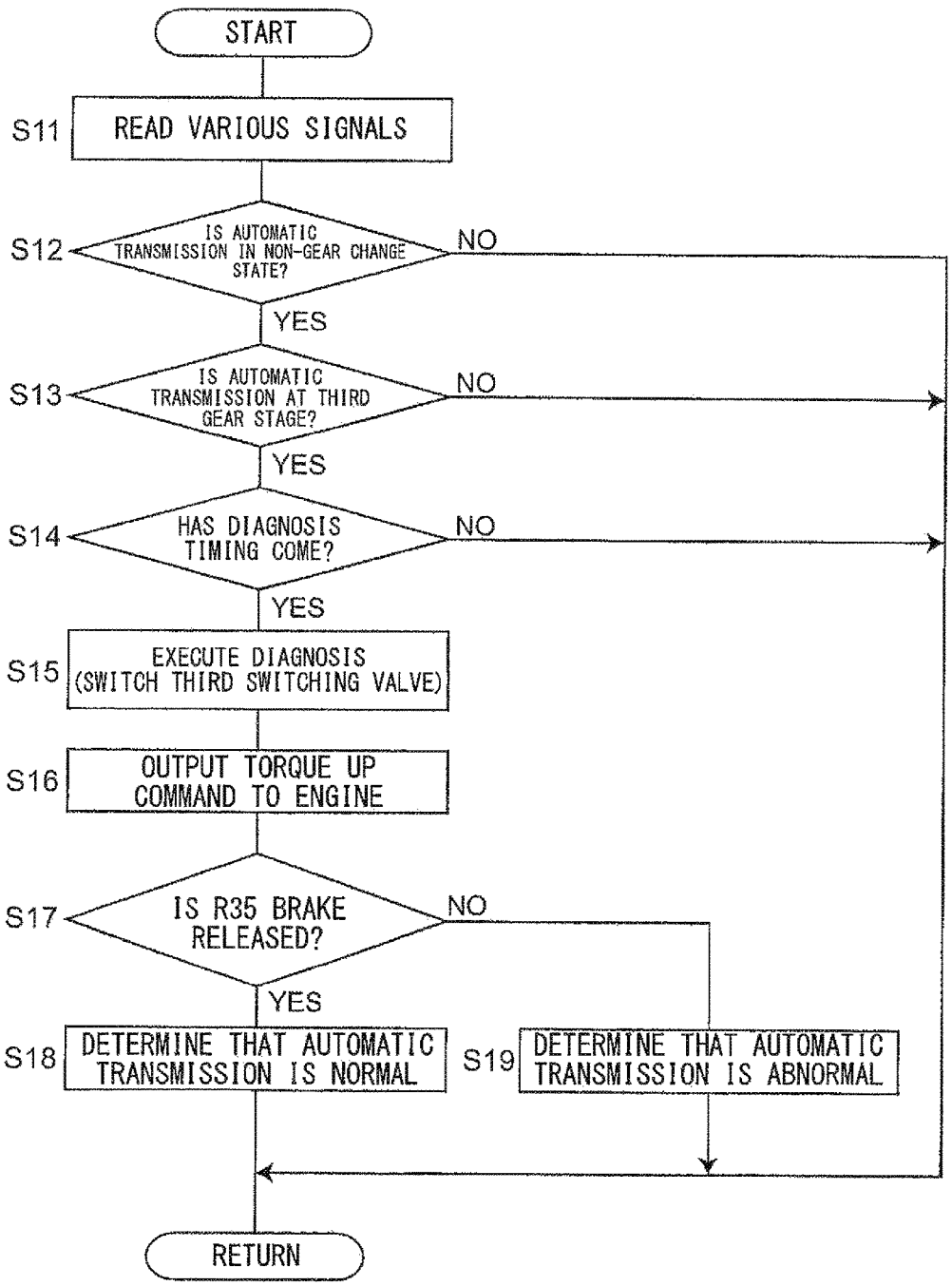
FIG. 15 is a flow chart showing one example the control operations of the abnormality diagnosis control according to Example 2.

FIG. 15 is a flow chart showing one example of control operations of the abnormality diagnosis control according to Example 2. The control operations shown in FIG. 15 are repeatedly executed by the TCM 202 while the vehicle is traveling forward.

According to the control operations shown in FIG. 15, first, in Step S11, the input signals from the sensors 210 to 214 and the oil pressure switch 224 are read.

Next, whether or not the automatic transmission is in the non-gear change state, whether or not the automatic transmission 1 is at the third gear stage, and whether or not a predetermined diagnosis timing has come are determined in Steps S12 to S14, respectively, based on the input signals read in Step S11.

Specifically, in Step S12, whether or not the gear change is not being executed is determined. The determination in Step S12 is performed based on a situation of the gear change control performed by the TCM 202 itself.

In Step S13, whether or not the third gear stage is realized is determined. The determination in Step S13 is performed based on, for example, whether or not the supply of the engagement oil pressure to the R35 brake 80 which should be engaged at the third gear stage has been detected by the oil pressure switch 224.

In Step S14, whether or not a predetermined timing at which the diagnosis should be executed has come is determined. The "predetermined timing" is set in advance as a timing at which the diagnosis is executed and is set to a timing at which the shift-down to the third gear stage and the first gear stage preparation operation are completed. Specifically, the predetermined timing is set to, for example, a timing at which a predetermined time has elapsed since the first gear stage preparation operation is executed.

As a result of the determinations in Steps S12 to S14, the diagnosis in Step S15 is executed only when the predetermined diagnosis timing has come at the third gear stage while the gear change is not being performed. When the diagnosis in Step S15 is executed, the third switching valve 118 is switched from the second state to the first state by reducing the opening degree of the third SV 103 as described above. In the diagnosis in Step S15, the third switching valve 118 is maintained in the first state for a predetermined diagnosis time. When the diagnosis time elapses, the opening degree of the third SV 103 is controlled to be increased to a size that is equal to the opening degree before the diagnosis, and the third switching valve 118 is returned from the first state to the second state. It is preferable that the diagnosis time in Step S15 be set to a minimum time in which whether or not there is an abnormality in the oil pressure circuit 100 can be accurately determined.

Together with the diagnosis in Step S15, in Step S16, a command for increasing the output torque of the engine by a predetermined amount is output to the ECU 201. Based on this command from the TCM 202, the ECU 201 increases the throttle opening degree to increase the output torque of the engine. The torque up command in Step S16 is continuously output while the diagnosis in Step S15 is being performed. With this, if the oil pressure circuit 100 is normal, and when the R35 brake 80 is released by the switching control of the third switching valve 118 in the diagnosis in Step S15, and the automatic transmission 1 becomes the neutral state, decreases in the engine revolution and the turbine revolution can be suppressed.

Next, in Step S17, whether or not the R35 brake 80 is released is determined. The determination in Step S17 is performed based on, for example, the detection result of the oil pressure switch 224 immediately before the third switching valve 118 which has been switched to the first state is returned to the second state in the diagnosis in Step S15. It should be noted that a specific method for the determination in Step S17 is not especially limited, and the determination in Step S17 may be performed based on a change in the turbine revolution.

As a result of the determination in Step S17, when the R35 brake 80 is released, it is determined that the automatic transmission 1 is normal (Step S18), and when the engaged state of the R35 brake 80 is maintained, it is determined that the automatic transmission 1 is abnormal (Step S19). The abnormality of the automatic transmission 1 determined by this diagnosis is specifically the abnormality of the abnormality diagnosis oil pressure supply portion 145, especially the malfunction of the first switching valve 114.

When the abnormality diagnosis oil pressure supply portion 145 is abnormal, the LR brake 60 cannot be engaged by switching the second switching valve 116 to the first state, so that the first gear stage cannot be realized (see the engagement table of FIG. 2). Therefore, when it is determined in Step S19 that there is an abnormality, the abnormality of the gear change control is informed to occupants by warning light or the like. In addition, in the subsequent gear change control, the limp home control in which the gear change control is performed without using the first gear stage is performed.

As above, according to Example 2, since the above abnormality diagnosis control is performed at the third gear stage, whether or not there is an abnormality which hinders the first gear stage from being realized can be determined before the shift-down to the first gear stage is performed. On this account, the erroneous gear change to the fourth gear stage can be avoided, the erroneous gear change being caused since the high clutch 50 is engaged by the malfunction of the second switching valve 116 when the command for the shift-down to the first gear stage is output, and therefore, the engine stall by the erroneous gear change can be avoided.

Figure 16:
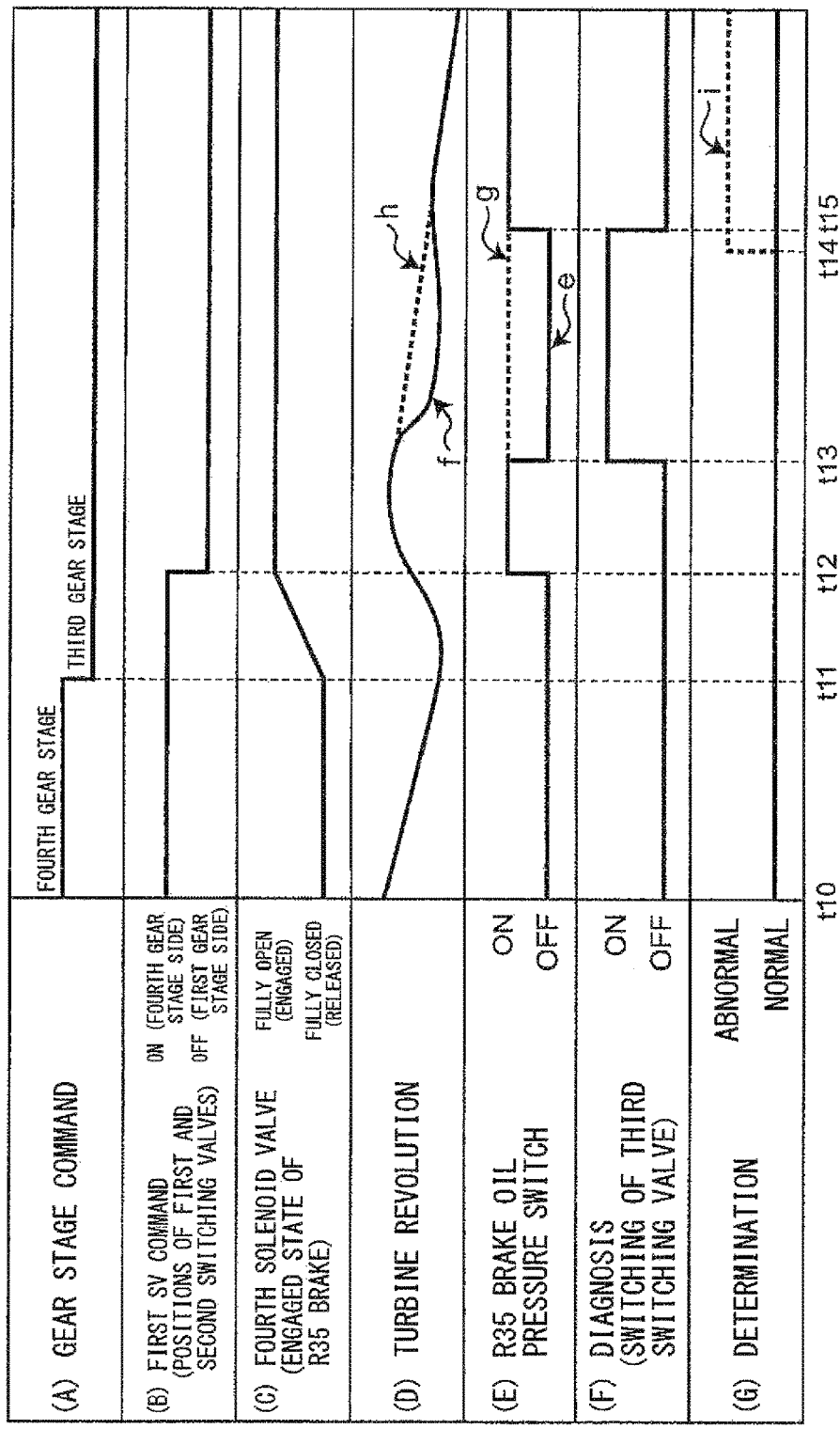
FIG. 16 is a time chart showing one example of the temporal changes of the respective components when the abnormality diagnosis control according to Example 2 is performed.

FIG. 16 is a time chart showing one example of the temporal changes of the respective components when the control operations shown in FIG. 15 are performed.

At a time point t10 shown in FIG. 16, the automatic transmission 1 is at the fourth gear stage, that is, the high clutch 50 is being engaged, and each of the first switching valve 114 and the second switching valve 116 is in the second state by turning on the first SV 101.

After that, when the shift-down to the third gear stage is performed in a period from a time point t11 to a time point t12, the high clutch 50 is released by turning off the second SV 102, and the R35 brake 80 is engaged by opening the fourth SV 104. Further, at the time point t12, as the first gear stage preparation operation, the first switching valve 114 is switched from the second state to the first state by turning off the first SV 101.

In the example of the control operations shown in FIG. 16, the first gear stage preparation operation is executed at the timing t12 at which the shift-down to the third gear stage is completed. However, the first gear stage preparation operation is only required to be executed at any timing at the third gear stage.

After that, the diagnosis of the abnormality diagnosis control (Step S15 of FIG. 15) is executed in a period from a time point t13 to a time point t15, and whether or not there is an abnormality is determined at a time point t14 immediately before the diagnosis terminates.

When the oil pressure circuit 100 is normal, as shown by "e" in FIG. 16, the R35 brake 80 is released during the diagnosis, and the automatic transmission 1 becomes the neutral state, and as shown by "f" in FIG. 16, the turbine revolution decreases. In this case, the decrease in the turbine revolution is suppressed by the torque up command (Step S16 in FIG. 15) output to the ECU 201 together with the execution of the diagnosis. Therefore, uncomfortable feeling of the occupants can be suppressed.

In contrast, when the oil pressure circuit 100 is abnormal, the engaged state of the R35 brake 80 is maintained as shown by "g" in FIG. 16, and the turbine revolution does not decrease as shown by "h" in FIG. 16. As a result, as shown by "i" in FIG. 16, it is determined that there is an abnormality.

The control example explained in Example 2 is just one example, and various modifications, deletions, and additions regarding the order of the control operations and specific details of the operations may be made.

For example, in Example 2, the first gear stage preparation operation does not necessarily have to be performed at the third gear stage and may be performed at the second gear stage. In this case, the abnormality diagnosis control is performed before the first gear stage preparation operation is performed. In this case, when the abnormality diagnosis control is performed, each of the first switching valve 114 and the second switching valve 116 is in the second state. Therefore, the diagnosis is performed in a state where the oil pressure of the line 129 is being input to the input port H2 of the third switching valve 118. On this account, in this case, when the engaged state of the R35 brake 80 is maintained by the execution of the diagnosis, it is determined that the automatic transmission 1 is normal, and when the R35 brake 80 is released by the execution of the diagnosis, it is determined that the automatic transmission 1 is abnormal.

Embodiment 2

The configuration of an oil pressure circuit 400 of the automatic transmission according to Embodiment 2 of the present invention will be explained in reference to FIG. 17.

The oil pressure circuit 400 is the same in configuration as the oil pressure circuit 100 of the above embodiment except for portions which are related to the engagement and release of the LR brake 60. Therefore, explanations of components that are the same as those of the oil pressure circuit 100 are omitted, and the same reference signs as above are used in FIG. 17.

Figure 17:
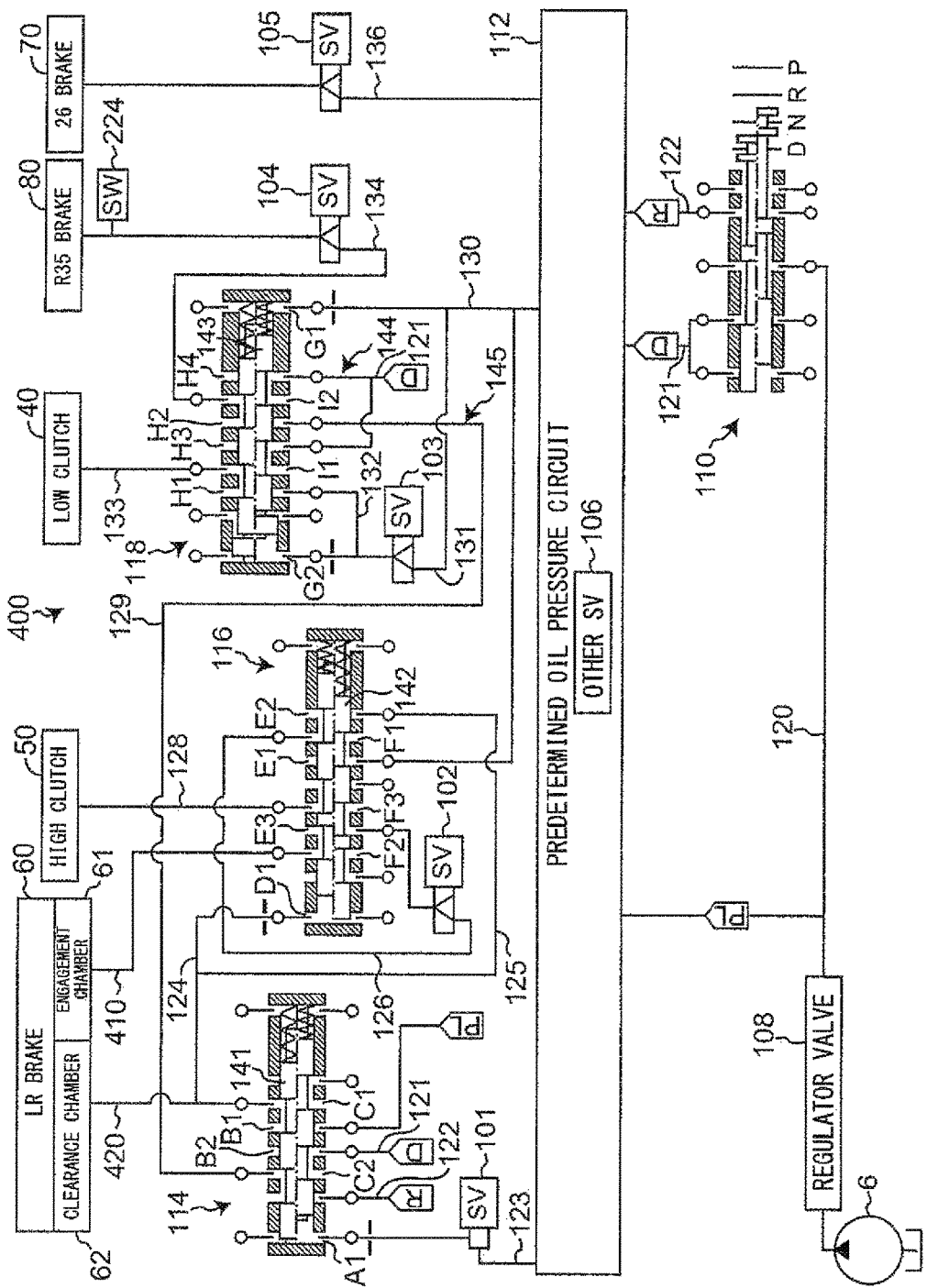
FIG. 17 is a circuit diagram showing the oil pressure circuit of the automatic transmission according to Embodiment 2 of the present invention.

In the embodiment shown in FIG. 17, a double acting type actuator (not shown) including an engagement piston and a gap adjustment piston is used as an oil pressure actuator of the LR brake 60, and the oil pressure circuit 400 is provided with a clearance chamber 62 and an engagement chamber 61. The clearance chamber 62 receives the supply of the oil pressure for causing the engagement piston together with the gap adjustment piston to perform a stroke to an engagement preparation position at which a small clearance state is realized. The engagement chamber 61 receives the supply of the oil pressure for engaging the LR brake 60 by operating the engagement piston located at the engagement preparation position.

The engagement chamber 61 is directly coupled to the output port F2 of the second switching valve 116 through a line 410, and the clearance chamber 62 is connected to the line 124 through a line 420, the line 124 being connected to the output port C1 of the first switching valve 114.

By turning off the first SV 101, the clearance chamber 62 is supplied with the line pressure through the line 124 and the line 420 from the output port C1 of the first switching valve 114 which is in the first state where the spool 141 is located at the left side. With this, the engagement piston performs a stroke to the engagement preparation position together with the gap adjustment piston and is maintained at the engagement preparation position.

As described above, when the first switching valve 114 is in the first state, the second switching valve 116 is in the first state where the spool 142 is located at the right side. Therefore, when the engagement piston is located at the engagement preparation position, the second switching valve 116 is in the first state. When the second SV 102 is opened in this state, the line pressure is input from the line 126 to the input port E3 of the second switching valve 116, and the line pressure is supplied from the output port F2 of the second switching valve 116 through the line 410 to the engagement chamber 61. With this, the engagement piston presses a friction plate to engage the LR brake 60.

As above, after the clearance is adjusted by the supply of the oil pressure to the clearance chamber 62, the engagement oil pressure is supplied to the engagement chamber 61. With this, the LR brake 60 can be engaged in the small clearance state. Therefore, regarding the LR brake 60 having a large capacity, engaging control that is accurate and excels in responsiveness can be realized.

On the other hand, when the LR brake 60 is in the released state, each of the engagement piston and the gap adjustment piston can be retreated to a position at which a large clearance state is realized. With this, rotational resistance by viscosity of lubricating oil is suppressed.

Other than the above, the oil pressure circuit 400 is the same in configuration as the oil pressure circuit 100 of the above embodiment. Regarding forward gear stages equal to or higher than the second gear stage, the same gear change control as the above embodiment is performed.

Therefore, the same abnormality diagnosis control as Example 1 can be performed at a predetermined timing at which the shift-up to the third gear stage is completed. On this account, since whether or not the oil pressure circuit 400 is abnormal is determined by the abnormality diagnosis control before the shift-up to the fourth gear stage is performed, the erroneous shift-down to the first gear stage by the abnormality of the oil pressure circuit 400 can be avoided, and therefore, the excessive rotation of the engine by the erroneous gear change can be prevented.

Further, the same abnormality diagnosis control as Example 2 can be performed at a predetermined timing at which the shift-down to the third gear stage is completed. Therefore, since whether or not the oil pressure circuit 400 is abnormal is determined by the abnormality diagnosis control before the shift-down to the first gear stage is performed, the erroneous shift-up to the fourth gear stage by the abnormality of the oil pressure circuit 400 can be avoided, and therefore, the engine stall by the erroneous gear change can be prevented.

The foregoing has explained the present invention using the above embodiments, but the present invention is not limited to the above embodiments.

For example, the above embodiment has explained an example in which the abnormality diagnosis is performed using the R35 brake 80 as a predetermined friction engaging element. However, according to the present invention, the abnormality diagnosis may be performed using the other friction engaging element.

Further, the above embodiment has explained an example in which: a gear stage corresponding to the predetermined change gear ratio is the third gear stage; and a gear stage corresponding to the change gear ratio close to the predetermined change gear ratio is the fourth gear stage. However, the present invention is also applicable to a case where the gear stage corresponding to the "predetermined change gear ratio" and the gear stage corresponding to the "change gear ratio close to the predetermined change gear ratio" are the other gear stages.

Embodiment 3

Next, the automatic transmission 1 according to Embodiment 3 of the present invention will be explained in reference to FIGS. 18 to 27. It should be noted that explanations of the same components as Embodiment 1 are omitted, and the same reference signs as Embodiment 1 are used in FIGS. 18 to 27.

Figure 18:
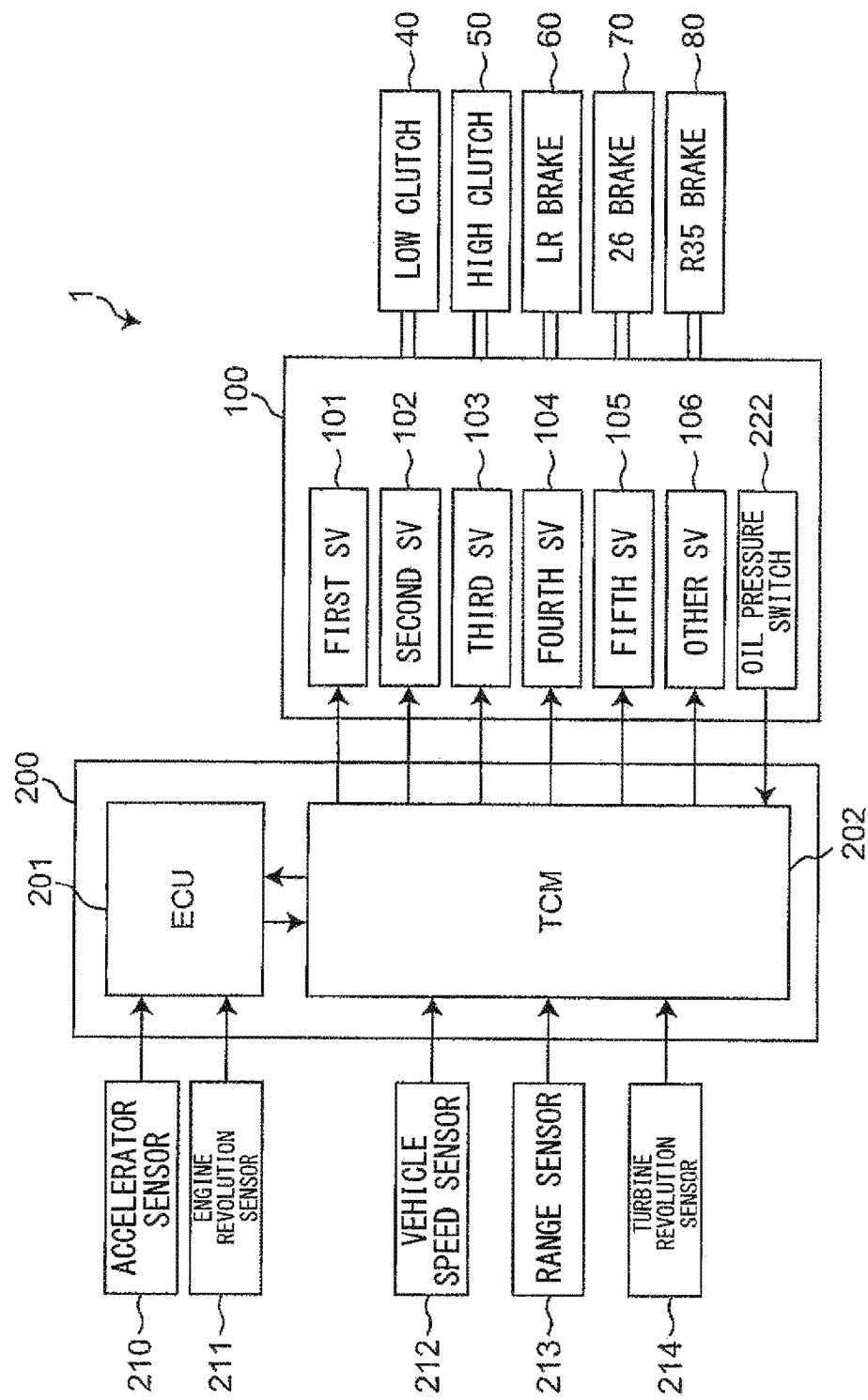
FIG. 18 is a control system diagram showing the automatic transmission according to Embodiment 3 of the present invention.
Figure 19:
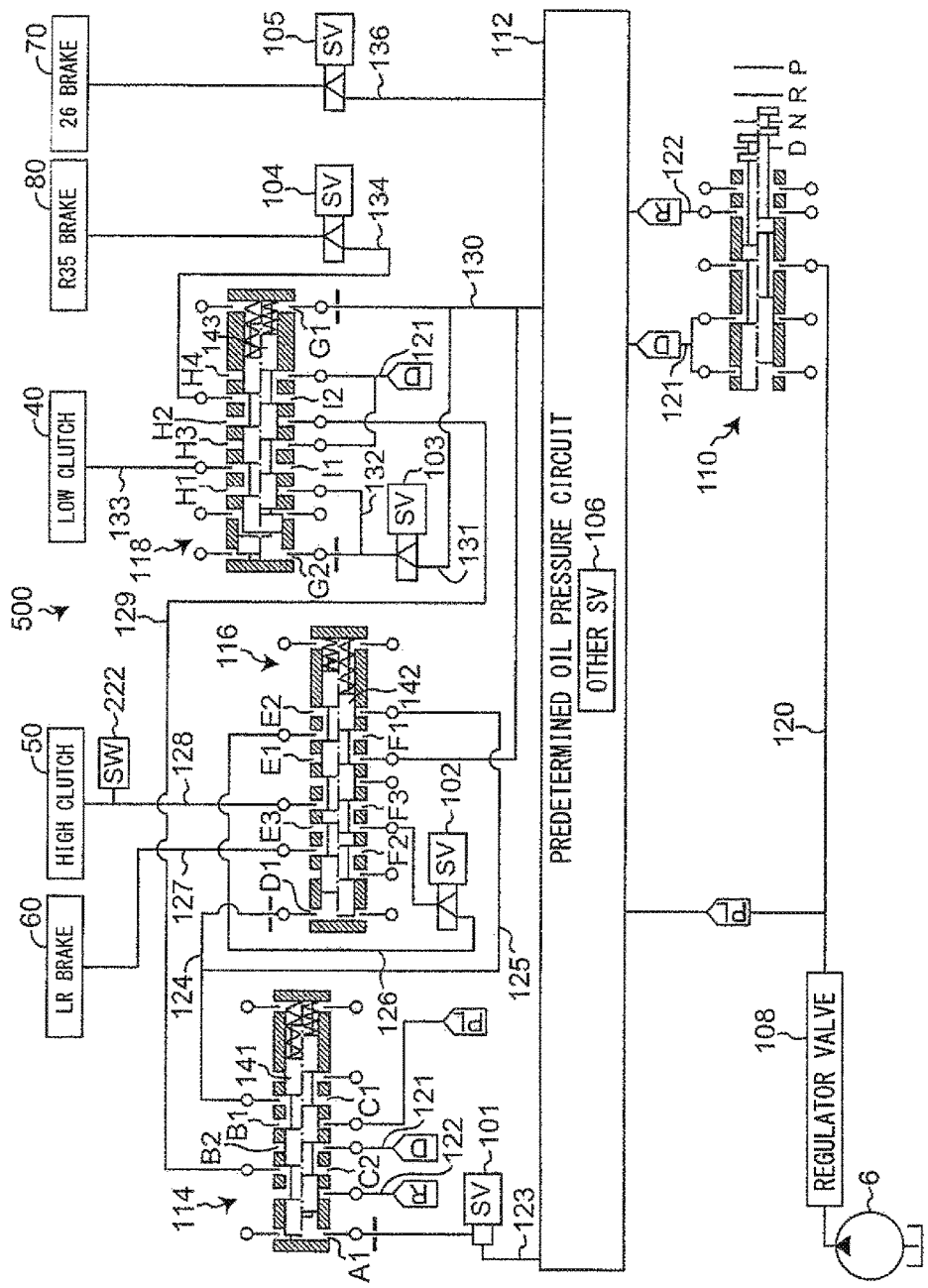
FIG. 19 is a circuit diagram showing the oil pressure circuit of the automatic transmission according to Embodiment 3.

FIG. 18 is a control system diagram showing the automatic transmission 1 according to Embodiment 3. FIG. 19 is a circuit diagram showing an oil pressure circuit 500 of the automatic transmission 1 according to Embodiment 3. According to the present embodiment, if the abnormality of an oil pressure control mechanism occurs in the vehicle on which the automatic transmission is mounted, such as if the erroneous shift-down is realized in response to the command for the shift-up, the excessive rotation of the engine is suppressed. As shown in FIG. 18, unlike the oil pressure circuit 100 of Embodiment 1, the oil pressure circuit 500 of the present embodiment is provided with an oil pressure switch 222 configured to detect the engaged or released state of the high clutch 50. As shown in FIG. 19, a signal from the oil pressure switch 222 of the oil pressure circuit is input to the TCM 202.

Figure 20:
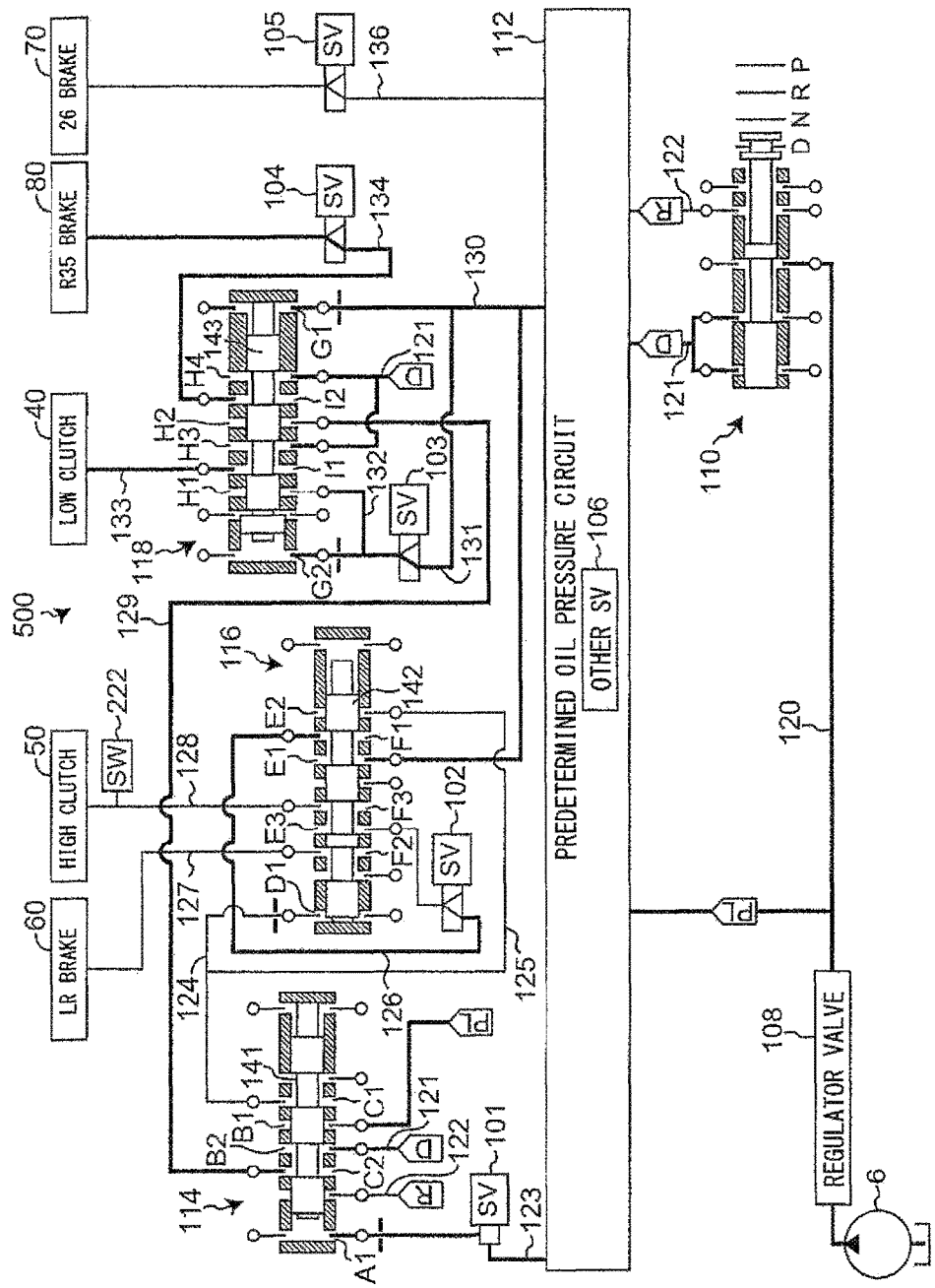
FIG. 20 is a circuit diagram showing the oil pressure circuit at the third gear stage.

FIG. 20 shows the oil pressure supply state where at the third gear stage, the second switching valve 116 is switched to the second state for the shift-up to the fourth gear stage. As shown in FIG. 20, at the third gear stage, the supply of the oil pressure to the input port E3 of the second switching valve 116 is being blocked by the second SV 102 provided between the second switching valve 116 and the oil pump 6.

When the shift-up to the fourth gear stage from the third gear stage is performed, the R35 brake 80 is released by closing the fourth SV 104, and the oil pressure introduced from the line 126 to the input port E3 of the second switching valve 116 is output from the output port F3 to the line 128 by opening the second SV 102. Thus, the high clutch 50 is engaged.

However, at this time, if the second switching valve 116 is fixed in the first state by the abnormality, such as: the valve stick in which the spool 141 of the first switching valve 114 is moved to the left side to be fixed or the spool 142 of the second switching valve 116 is moved to the right side to be fixed; or the malfunction of the first SV 101, the oil pressure introduced to the input port E3 of the second switching valve 116 is output from the output port F2 to the line 127. In this case, although the command for the shift-up to the fourth gear stage is being output, the LR brake 60 is engaged instead of the high clutch 50, and therefore, the shift-down to the first gear stage is mistakenly realized. If such shift-down to the first gear stage from the third gear stage is executed in an accelerating state where the accelerator pedal is being stepped on, the engine may excessively rotate. To suppress such excessive rotation of the engine, the TCM 202 performs the following gear change condition setting control.

Gear Change Condition Setting Control

In the gear change control, a so-called gear change chart including a vehicle speed and an accelerator opening degree as parameters is used as gear change conditions (a shift-up condition and a shift-down condition) of respective gear change patterns. The shift-up or the shift-down is performed when the vehicle speed detected by the vehicle speed sensor 212 and the accelerator opening degree detected by the accelerator sensor 210 satisfy the above gear change conditions.

Predetermined normal conditions are set as the gear change conditions of the respective gear change patterns. The gear change control is performed basically based on these normal conditions. However, the gear change conditions different from the normal conditions may be used depending on a driving state. To perform the gear change control by always using the most appropriate gear change condition, the TCM 202 performs the gear change condition setting control for suitably setting the gear change condition depending on the driving state.

In the present embodiment, the normal condition or a low vehicle speed side condition that is set to a low vehicle speed side of the normal condition is used as a condition (hereinafter referred to as a "third-fourth gear stage shift-up condition") for the shift-up to the fourth gear stage from the third gear stage. It should be noted that the third gear stage in the present embodiment corresponds to a "third change gear ratio" in claims, and the fourth gear stage in the present embodiment corresponds to a "second change gear ratio" in claims.

In the gear change condition setting control, the normal condition is basically set as the third-fourth gear stage shift-up condition. However, in the driving state where there is a possibility that the shift-down to the first gear stage is realized in response to the command for the shift-up to the fourth gear stage as above, the low vehicle speed side condition is set as the third-fourth gear stage shift-up condition. Specifically, the normal condition is used when it is confirmed that the second switching valve 116 is switched from the first state to the second state, and the low vehicle speed side condition is used when it is not confirmed that the second switching valve 116 is switched from the first state to the second state. It should be noted that the first gear stage in the present embodiment corresponds to a "first change gear ratio" in claims.

A confirmation determination regarding whether or not the second switching valve 116 is switched to the second state is performed by below-described switching confirmation control. The switching confirmation control is repeatedly executed at all times while the vehicle is traveling forward. The gear change condition setting control is performed depending on whether or not the confirmation determination is performed by the switching confirmation control.

Figure 21:
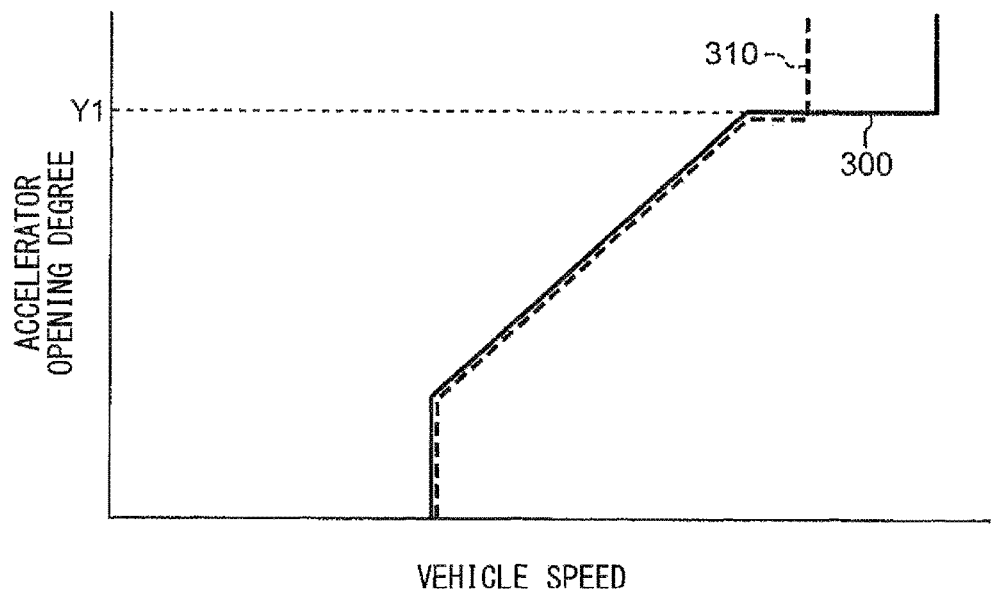
FIG. 21 is a gear change chart showing one example of a third-fourth gear stage shift-up condition.

As the normal condition, for example, a condition defined by a solid line shown by "300" in FIG. 21 is set. The normal condition 300 is set such that a vehicle speed condition when the accelerator opening degree is larger than a predetermined opening degree Y1 is higher than a vehicle speed condition when the accelerator opening degree is equal to or smaller than the predetermined opening degree Y1.

As the low vehicle speed side condition, for example, a condition defined by a broken line shown by "310" in FIG. 21 is set. The low vehicle speed side condition 310 is set such that: the vehicle speed condition when the accelerator opening degree is larger than the predetermined opening degree Y1 is lower than the vehicle speed condition of the normal condition 300; and the vehicle speed condition when the accelerator opening degree is equal to or smaller than the predetermined opening degree Y1 is equal to the vehicle speed condition of the normal condition 300.

The low vehicle speed side condition 310 is set as above. With this, in a case where the switching of the second switching valve 116 to the second state is not confirmed when the vehicle is accelerating in a state where the accelerator opening degree is larger than the predetermined opening degree Y1, that is, in a case where there is a possibility that the shift-down to the first gear stage is realized by the malfunction of the second switching valve 116 when the command for the shift-up to the fourth gear stage is output next, the command for the shift-up to the fourth gear stage is output earlier than normal at a relatively low vehicle speed. Therefore, even if the shift-down to the first gear stage is mistakenly performed by the malfunction of the second switching valve 116, the increase in the engine revolution can be suppressed to a relatively low level, and therefore, the excessive rotation of the engine can be suppressed.

On the other hand, in the driving state where the excessive rotation of the engine hardly occurs since the accelerator opening degree is equal to or smaller than the predetermined opening degree Y1, the normal gear change control using the normal condition 300 is performed.

Figure 22:
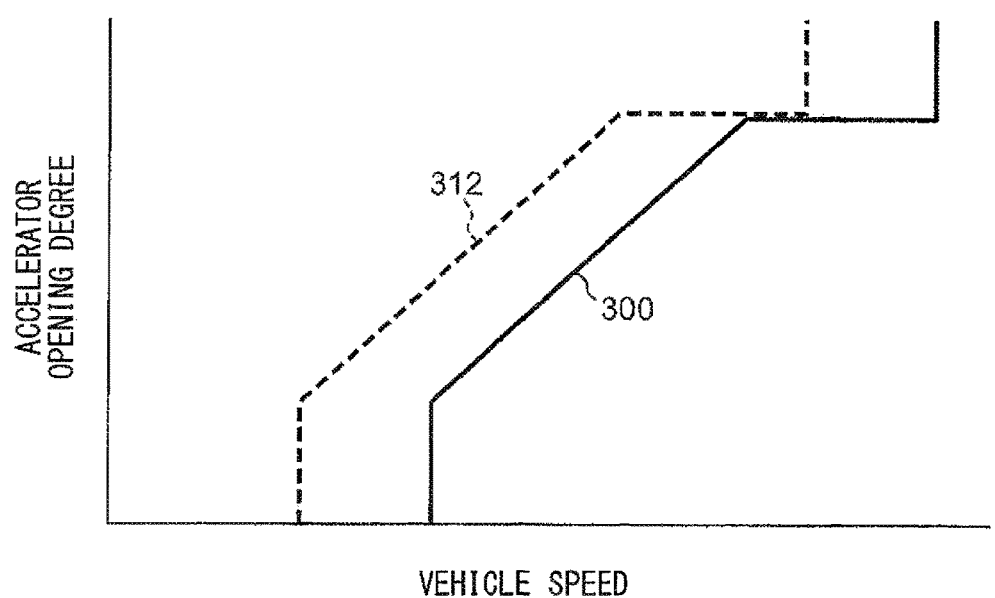
FIG. 22 is a gear change chart showing a modified example of the third-fourth gear stage shift-up condition.

It should be noted that the low vehicle speed side condition is not limited to the condition 310 shown in FIG. 21 and may be, for example, a low vehicle speed side condition defined by a broken line shown by "312" in FIG. 22. The low vehicle speed side condition 312 shown in FIG. 22 is set to the low vehicle speed side of the normal condition 300 regardless of the accelerator opening degree.

When the low vehicle speed side condition 312 is set, the command for the shift-up to the fourth gear stage is output earlier than normal at a relatively low vehicle speed regardless of the accelerator opening degree. Therefore, even if the shift-down to the first gear stage is mistakenly performed by the malfunction of the second switching valve 116, the increase in the engine revolution can be suppressed to a relatively low level regardless of the driving state at this time.

Switching Confirmation Control

One example of the control operations of the switching confirmation control performed by the TCM 202 will be explained in reference to a flow chart shown in FIG. 23.

Figure 23:
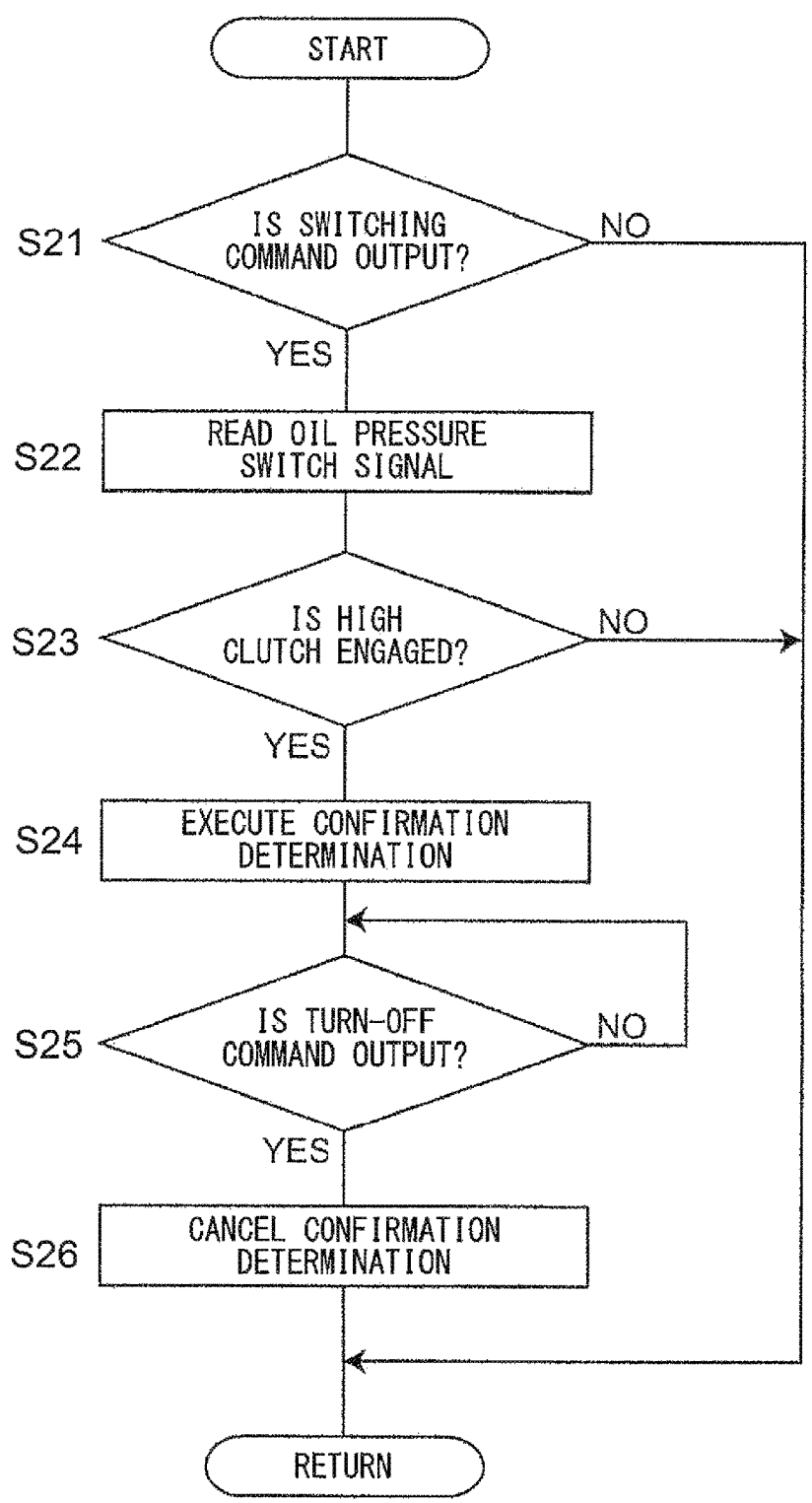
FIG. 23 is a flow chart showing one example of control operations of switching confirmation control.

The control operations shown in FIG. 23 are repeatedly performed at all times while the gear change control is being performed during the forward traveling of the vehicle.

First, whether or not a command for turning on the first SV 101 for switching each of the first switching valve 114 and the second switching valve 116 from the first state to the second state is output in the gear change control is determined in Step S21.

As a result of the determination in Step S21, when the command for turning on the first SV 101 is being output, an output signal of the oil pressure switch 222 for the high clutch 50 is read in Step S22, and whether or not the high clutch 50 is in the engaged state is determined in Step S23 based on on/off of the oil pressure switch 222.

As shown in the engagement table of FIG. 2, the engaged state of the high clutch 50 is realized at the fourth to sixth gear stages. Therefore, when any of the fourth to sixth gear stages is realized, it is determined in Step S23 that the high clutch 50 is in the engaged state.

When it is determined in Step S23 that the high clutch 50 is in the engaged state, the confirmation determination of determining that it is confirmed that the second switching valve 116 is in the second state is executed in Step S24.

In contrast, when it is determined in Step S23 that the high clutch 50 is not in the engaged state, the confirmation determination in Step S24 is not executed. This is because even if the second switching valve 116 is in the second state, this cannot be confirmed.

After the confirmation determination in Step S24 is executed, whether or not a command for turning off the first SV 101 for returning each of the first switching valve 114 and the second switching valve 116 from the second state to the first state is output is determined in Step S25.

The determination in Step S25 is repeatedly executed until the command for turning off the first SV 101 is output, and during this time, the confirmation determination made in Step S24 is maintained.

When it is determined in Step S25 that the command for turning off the first SV 101 is output, the confirmation determination made in Step S24 is canceled in Step S26.

In the above switching confirmation control, even in a case where the confirmation determination in Step S24 is executed by confirming that the second switching valve 116 is normally switched to the second state, the confirmation determination is canceled (Step S26). This is because when the command for returning the second switching valve 116 to the first state is output after the confirmation determination, the next switching to the second state may or may not be normally performed. With this, when the confirmation determination by the switching confirmation control is valid, the second switching valve 116 is surely in the second state.

It should be noted that the switching confirmation control is not limited to the control including the control operations shown in FIG. 23 and may be control including the other control operations by which it can be confirmed that the second switching valve 116 is in the second state. For example, according to the control operations shown in FIG. 23, the confirmation determination is performed for the first time when the high clutch 50 is engaged by the shift-up to the fourth gear stage. However, when the second switching valve 116 is switched to the second state at the second gear stage or the third gear stage, and whether or not the second switching valve 116 is switched to the second state can be diagnosed by any method before the shift-up to the fourth gear stage, the confirmation determination may be executed based on the result of this diagnosis.

Control Operations of Gear Change Condition Setting Control

Hereinafter, Examples 1 and 2 will be explained as specific examples of the control operations of the gear change condition setting control.

Example 1

The control operations of the gear change condition setting control according to Example 1 will be explained in reference to a flow chart shown in FIG. 24 and a time chart shown in FIG. 25.

Figure 24:
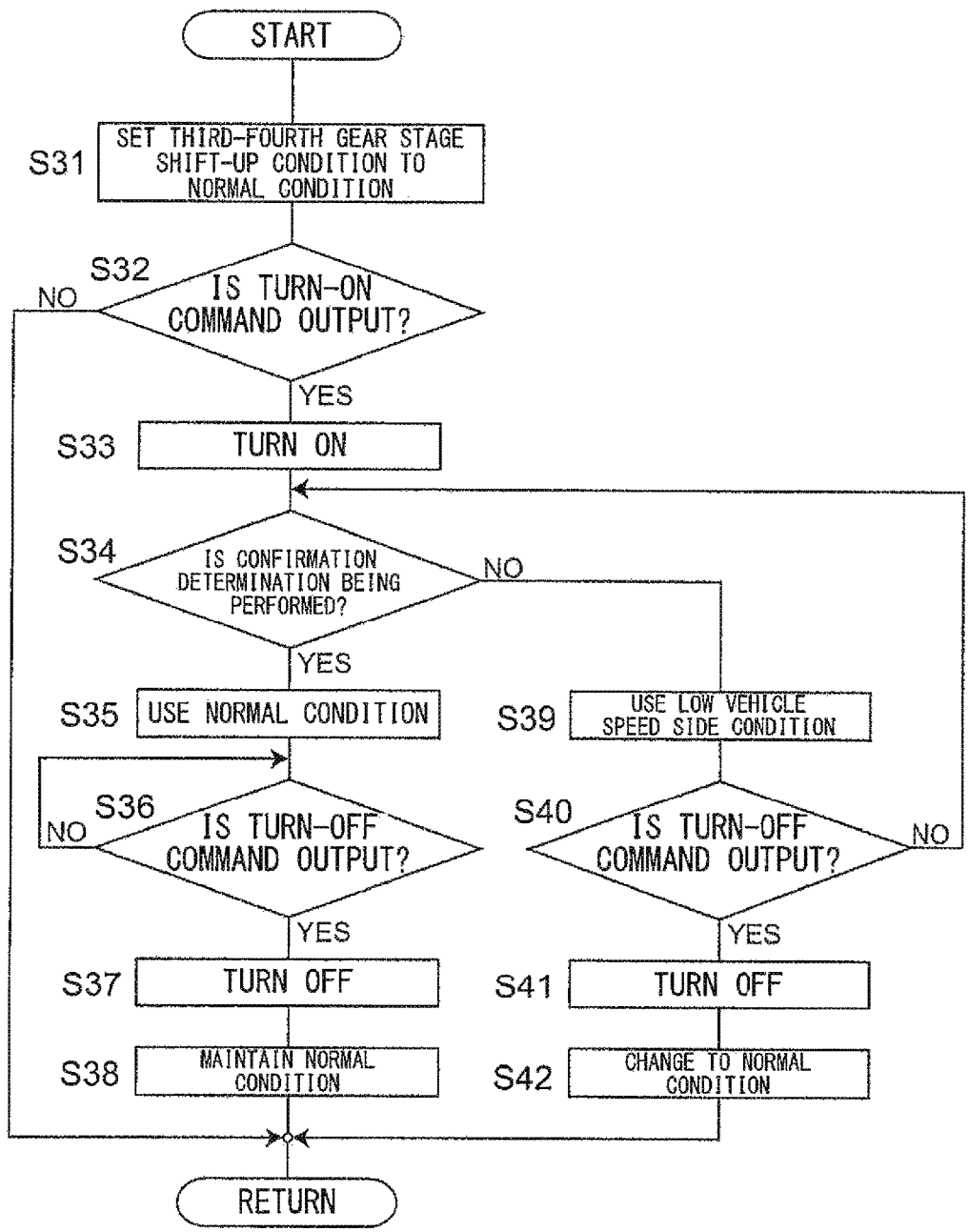
FIG. 24 is a flow chart showing control operations of gear change condition setting control according to Example 1.

The control operations shown in FIG. 24 are repeatedly executed at all times while the gear change control is being performed during the forward traveling of the vehicle. Further, all the determinations in the control operations shown in FIG. 24 are executed based on processing details of the gear change control or switching confirmation control performed by the TCM 202 itself. Therefore, an input signal from an external device to the TCM 202 is not used in the control operations shown in FIG. 24.

According to the control operations shown in FIG. 24, first, the third-fourth gear stage shift-up condition is set to the normal condition in Step S31. After this, the gear change control is performed basically based on the normal condition.

Next, whether or not the command for turning on the first SV 101 for switching each of the first switching valve 114 and the second switching valve 116 from the first state to the second state is output in the gear change control is determined in Step S32. The determination in Step S32 is performed based on the situation of the gear change control performed by the TCM 202 itself.

It should be noted that the command for turning on the first SV 101 is output before the command for the shift-up to the fourth gear stage is output during the acceleration of the vehicle. Specifically, the command for turning on the first SV 101 is output at, for example, a timing when a predetermined time has elapsed since the output of the command for the shift-up to the third gear stage.

As a result of the determination in Step S32, when the command for turning on the first SV 101 is not being output, the gear change control based on the normal condition is continuously performed.

In contrast, as a result of the determination in Step S32, when the command for turning on the first SV 101 is being output, the first SV 101 is turned on in Step S33. At this time, when there is no abnormality such as the malfunction of the first SV 101 or the valve stick of the first switching valve 114 or the second switching valve 116, each of the first switching valve 114 and the second switching valve 116 is normally switched from the first state to the second state.

Next, in Step S34, whether or not the confirmation determination (S24 in FIG. 23) by the switching confirmation control (see FIG. 23) is being performed is determined. The determination in Step S34 is performed based on the situation of the switching confirmation control performed by the TCM 202 itself.

As described above, the confirmation determination is executed when, for example, the shift-up to the fourth gear stage is realized. However, in a case where whether or not the second switching valve 116 is in the second state is diagnosed by any method at the second gear stage or the third gear stage, the confirmation determination by the switching confirmation control is executed when it is determined by the above diagnosis that the second switching valve 116 is in the second state.

As a result of the determination in Step S34, when the confirmation determination is not being performed, the third-fourth gear stage shift-up condition is changed from the normal condition to the low vehicle speed side condition in Step S39, and whether or not the command for turning off the first SV 101 for returning each of the first switching valve 114 and the second switching valve 116 to the first state from the second state is output in the gear change control is determined in Step S40. The determination in Step S40 is performed based on the situation of the gear change control performed by the TCM 202 itself.

A series of control operations in Steps S34, S39, and S40 are repeatedly performed until the confirmation determination by the switching confirmation control is performed or the command for turning off the first SV 101 is output. While the series of control operations are being performed, there is a possibility that when the command for the shift-up to the fourth gear stage is output, the shift-down to the first gear stage is realized by the malfunction of the second switching valve 116. However, the low vehicle speed side condition is set as the third-fourth gear stage shift-up condition, so that even if the malfunction of the second switching valve 116 is occurring, the shift-down is realized at a relatively low vehicle speed. Thus, the excessive rotation of the engine can be suppressed.

As a result of the determination in Step S40, when the command for turning off the first SV 101 is output, the first SV 101 is turned off in Step S41. With this, each of the first switching valve 114 and the second switching valve 116 is returned to the first state, or if each of the first switching valve 114 and the second switching valve 116 malfunctions to be fixed in the first state, it is maintained in the first state. In Step S42, the third-fourth gear stage shift-up condition is returned to the normal condition. With this, the gear change control based on the normal condition is performed until the command for turning on the first SV 101 (Step S33) is output next.

In contrast, as a result of the determination in Step S34, when the confirmation determination is being performed, the second switching valve 116 is normally operating, so that the shift-up to the fourth gear stage can be normally performed. Therefore, the normal condition is used as the third-fourth gear stage shift-up condition in Step S35.

In Step S36, as with Step S40, whether or not the command for turning off the first SV 101 is output is determined. The determination in Step S36 is repeatedly performed until the command for turning off the first SV 101 is output. During this, the third-fourth gear stage shift-up condition is maintained as the normal condition.

As a result of the determination in Step S36, when the command for turning off the first SV 101 is output, the first SV 101 is turned off in Step S37. With this, each of the first switching valve 114 and the second switching valve 116 is returned to the first state. In Step S38, the third-fourth gear stage shift-up condition is continuously maintained as the normal condition.

As above, according to Example 1, only in a period from when the command for switching the second switching valve 116 to the second state is output until when the confirmation determination for confirming this switching is output, the low vehicle speed side condition is used as the third-fourth gear stage shift-up condition. In the other period, the normal condition is basically used. Therefore, the normal gear change control based on the normal condition is basically performed, and the low vehicle speed side condition is used as needed. With this, even if the erroneous shift-down to the first gear stage is realized by the malfunction of the second switching valve 116, the excessive rotation of the engine by the shift-down can be suppressed.

If the confirmation determination by the switching confirmation control is not performed although the command for the shift-up to the fourth gear stage is being output, the high clutch 50 cannot be engaged by the malfunction of the second switching valve 116, and the fourth to sixth gear stages which requires the engagement of the high clutch 50 cannot be realized. Therefore, in the subsequent gear change control, the limp home control is executed, that is, forward traveling only by the first to third gear stages is performed.

Figure 25:
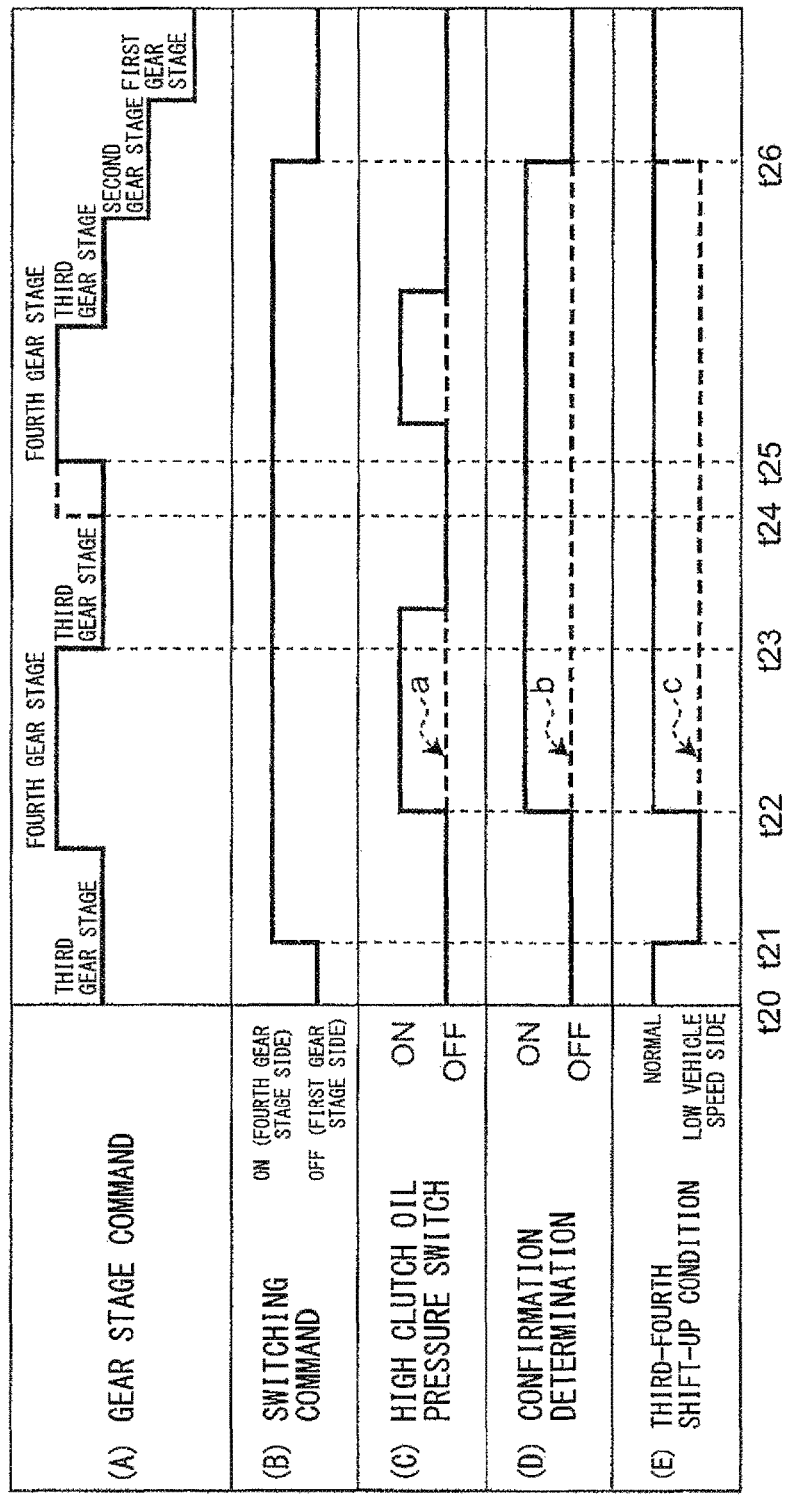
FIG. 25 is a time chart showing one example of the temporal changes of the respective components when the gear change condition setting control according to Example 1 is performed.

FIG. 25 is a time chart showing one example of temporal changes of the respective components when the gear change control is performed while performing the switching confirmation control shown in FIG. 23 and the gear change condition setting control shown in FIG. 24.

At a time point t20 shown in FIG. 25, the automatic transmission 1 is at the third gear stage, the third-fourth gear stage shift-up condition is being set to the normal condition. When the command for turning on the first SV 101 for switching each of the first switching valve 114 and the second switching valve 116 from the first state to the second state is output at a predetermined timing t21 at the third gear stage, the third-fourth gear stage shift-up condition is switched from the normal condition to the low vehicle speed side condition.

At this time, in a case where the second switching valve 116 is normally switched to the second state, the high clutch 50 is engaged at a time point t22 by the subsequent command for the shift-up to the fourth gear stage, so that the fourth gear stage is realized. In addition, when the engaged state of the high clutch 50 is detected, the confirmation determination by the switching confirmation control is performed, so that the third-fourth gear stage shift-up condition is returned to the normal condition.

In contrast, in a case where the malfunction of the second switching valve 116 occurs by the valve stick or the like, as shown by "a" in FIG. 25, the high clutch 50 is not engaged even at and after the time point t22 after the command for the shift-up to the fourth gear stage is output, and as shown by "b" in FIG. 25, the confirmation determination by the switching confirmation control is not performed. In this case, as shown by "c" in FIG. 25, in a period from the time point t22 until a time point t26 at which the command for turning off the first SV 101 for returning the second switching valve 116 to the first state is output, the low vehicle speed side condition is used as the third-fourth gear stage shift-up condition.

As above, in a case where the malfunction of the second switching valve 116 is occurring, the low vehicle speed side condition is used even at and after the time point t22. Therefore, a timing t24 at which the command for the shift-up to the fourth gear stage is output after the command for the shift-down to the third gear stage is once output at the time point t23 becomes earlier than the timing t5 at which the command for the shift-up to the fourth gear stage is output when the normal condition is used. On this account, even when the shift-down to the first gear stage is mistakenly realized by the malfunction of the second switching valve 116, this shift-down is realized at a relatively low vehicle speed. Thus, the excessive rotation of the engine can be suppressed.

Without performing special abnormality diagnosis control for determining whether or not there is the malfunction of the second switching valve 116, the excessive rotation of the engine can be suppressed by changing the third-fourth gear stage shift-up condition as above. Therefore, even when the command for the shift-up to the fourth gear stage is output quickly to such a degree that a time for the abnormality diagnosis control cannot be secured at the second gear stage or the third gear stage, the excessive rotation of the engine can be surely suppressed.

Further, when the gear change control shown in FIG. 25 is performed, and the second switching valve 116 normally operates, the normal gear change control can be performed basically based on the normal condition in a period other than a period from the time point t21 until the time point t22.

Example 2

The control operations of the gear change condition setting control according to Example 2 will be explained in reference to a flow chart shown in FIG. 26 and a time chart shown in FIG. 27.

Figure 26:
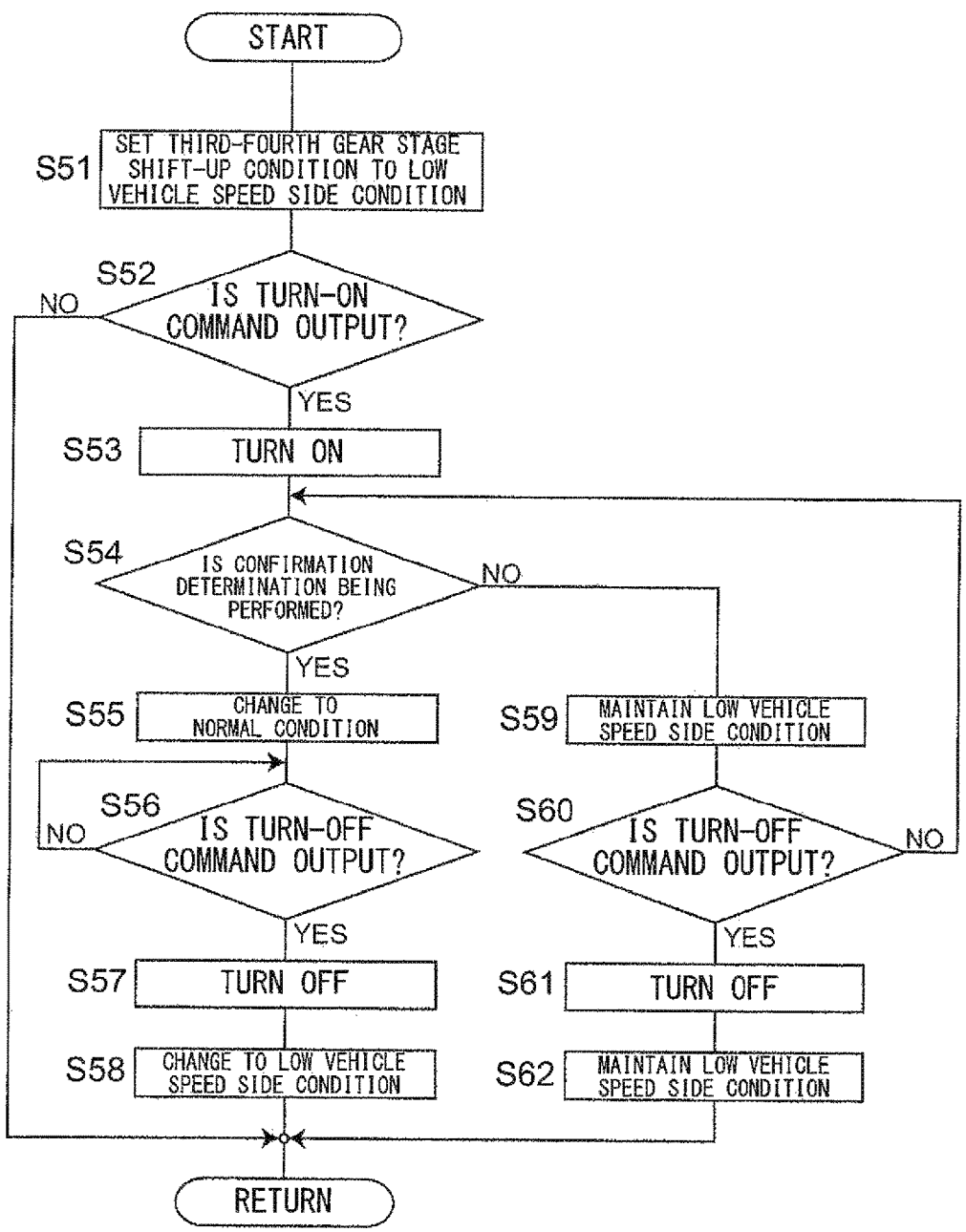
FIG. 26 is a flow chart showing the control operations of the gear change condition setting control according to Example 2.

The control operations shown in FIG. 26 are repeatedly executed at all times while the gear change control is being performed during the forward traveling of the vehicle. Further, all the determinations in the control operations shown in FIG. 26 are executed based on processing details of the gear change control or switching confirmation control performed by the TCM 202 itself. Therefore, an input signal from an external device to the TCM 202 is not used in the control operations shown in FIG. 26.

According to the control operations shown in FIG. 26, first, the third-fourth gear stage shift-up condition is set to the low vehicle speed side condition in Step S51. Then, the low vehicle speed side condition is maintained until the command for turning on the first SV 101 for switching each of the first switching valve 114 and the second switching valve 116 from the first state to the second state is output, and the confirmation determination by the switching confirmation control is performed.

Next, in Step S52, whether or not the command for turning on the first SV 101 is output in the gear change control is determined. As a result of the determination in Step S52, when the command for turning on the first SV 101 is being output, the first SV 101 is turned on in Step S53.

Next, in Step S54, whether or not the confirmation determination (Step S24 in FIG. 23) by the switching confirmation control (see FIG. 23) is being performed is determined.

As a result of the determination in Step S54, when the confirmation determination is not being performed, the third-fourth gear stage shift-up condition is maintained as the low vehicle speed side condition in Step S59, and whether or not the command for turning off the first SV 101 for returning each of the first switching valve 114 and the second switching valve 116 to the first state from the second state is output in the gear change control is determined in Step S60.

A series of control operations in Steps S54, S59, and S60 are repeatedly performed until the confirmation determination by the switching confirmation control is performed or the command for turning off the first SV 101 is output. While the series of control operations are being performed, there is a possibility that when the command for the shift-up to the fourth gear stage is output, the shift-down to the first gear stage is realized by the malfunction of the second switching valve 116. However, the low vehicle speed side condition is set as the third-fourth gear stage shift-up condition, so that even if the malfunction of the second switching valve 116 is occurring, the shift-down is realized at a relatively low vehicle speed. Thus, the excessive rotation of the engine can be suppressed.

As a result of the determination in Step S60, when the command for turning off the first SV 101 is output, the first SV 101 is turned off in Step S61. With this, each of the first switching valve 114 and the second switching valve 116 is returned to the first state, or if each of the first switching valve 114 and the second switching valve 116 malfunctions to be fixed in the first state, it is maintained in the first state. In Step S62, the third-fourth gear stage shift-up condition is maintained as the low vehicle speed side condition. The low vehicle speed side condition is continuously maintained until the command for turning on the first SV 101 is output next, and the confirmation determination by the switching confirmation control is performed.

In contrast, as a result of the determination in Step S54, when the confirmation determination is being performed, the second switching valve 116 is normally operating, so that there is a high possibility that the shift-up to the fourth gear stage is normally realized. Therefore, in Step S55, the third-fourth gear stage shift-up condition is changed from the low vehicle speed side condition to the normal condition.

In Step S56, as with Step S60, whether or not the command for turning off the first SV 101 is output is determined. The determination in Step S56 is repeatedly performed until the command for turning off the first SV 101 is output. During this, the third-fourth gear stage shift-up condition is maintained as the normal condition.

As a result of the determination in Step S56, when the command for turning off the first SV 101 is output, the first SV 101 is turned off in Step S57. With this, each of the first switching valve 114 and the second switching valve 116 is returned to the first state. In Step S58, the third-fourth gear stage shift-up condition is returned to the low vehicle speed side condition. The low vehicle speed side condition is continuously maintained until the command for turning on the first SV 101 is output next, and the confirmation determination by the switching confirmation control is performed.

As above, according to Example 2, when the command for switching the second switching valve 116 to the second state is output, and the confirmation determination for confirming this switching is output, the normal condition is used as the third-fourth gear stage shift-up condition. Therefore, when the second switching valve 116 is normally operating, the shift-up to the fourth gear stage can be performed based on the normal condition. Further, when the confirmation determination is not being output, the low vehicle speed side condition is used as the third-fourth gear stage shift-up condition. Therefore, even if the erroneous shift-down to the first gear stage is realized by the malfunction of the second switching valve 116, the excessive rotation of the engine by the shift-down can be suppressed.

Figure 27:
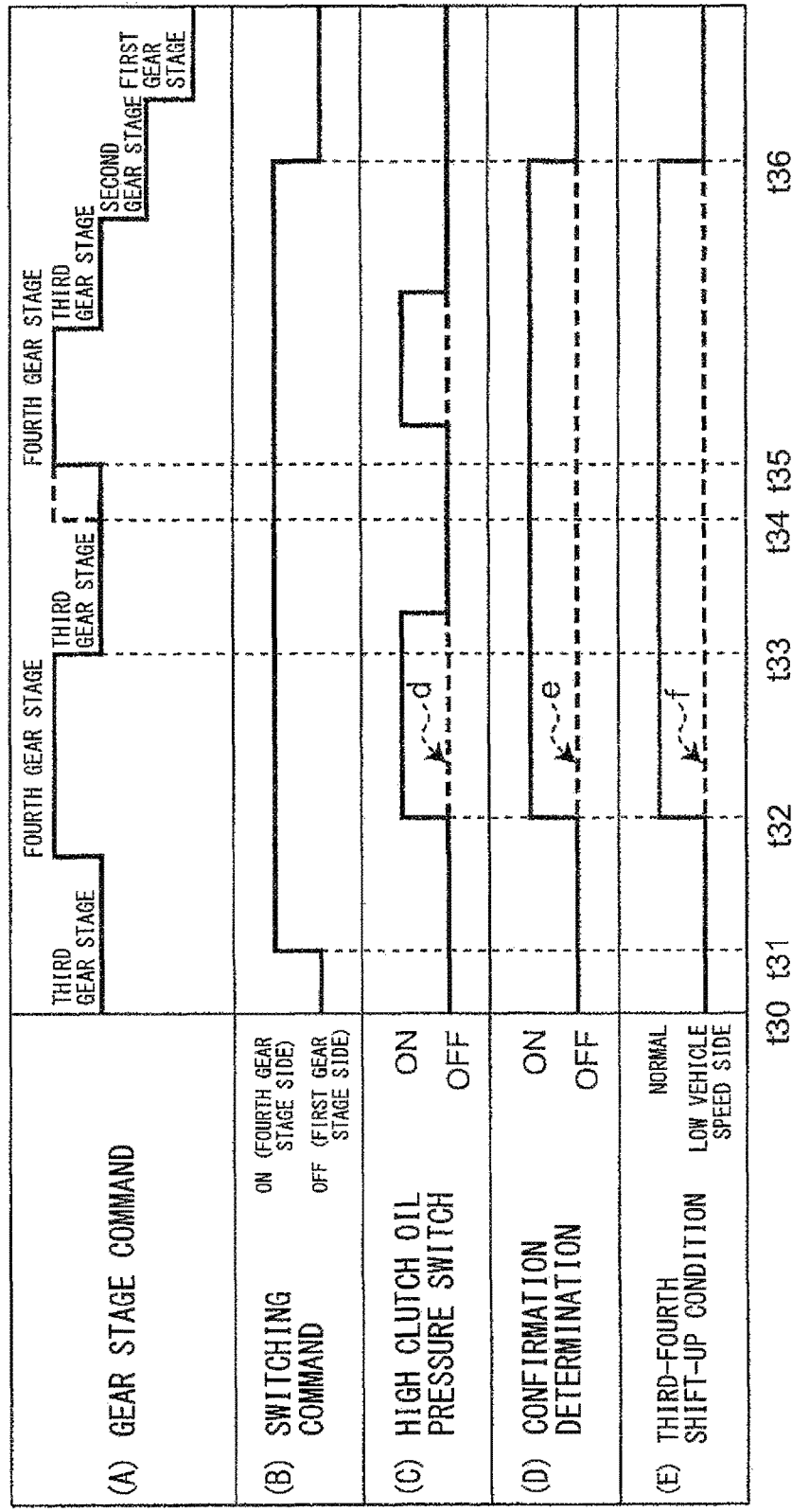
FIG. 27 is a time chart showing one example of the temporal changes of the respective components when the gear change condition setting control according to Example 2 is performed.

FIG. 27 is a time chart showing one example of temporal changes of the respective components when the gear change control is performed while performing the switching confirmation control shown in FIG. 23 and the gear change condition setting control shown in FIG. 26.

According to the control example shown in FIG. 27, at a time point t30, the automatic transmission 1 is at the third gear stage, and the third-fourth gear stage shift-up condition is being set to the low vehicle speed side condition. After that, the command for turning on the first SV 101 for switching each of the first switching valve 114 and the second switching valve 116 from the first state to the second state is output at a predetermined timing t31 at the third gear stage.

At this time, the third-fourth gear stage shift-up condition has already been set to the low vehicle speed side condition, and it is unnecessary to change this setting.

In a case where the second switching valve 116 is normally switched to the second state in response to the command for turning on the first SV 101 at a time point t31, the high clutch 50 is engaged at a time point t32 by the subsequent command for the shift-up to the fourth gear stage, so that the fourth gear stage is realized. In addition, when the engaged state of the high clutch 50 is detected, the confirmation determination by the switching confirmation control is performed, so that the third-fourth gear stage shift-up condition is changed from the low vehicle speed side condition to the normal condition.

In contrast, in a case where the malfunction of the second switching valve 116 occurs by the valve stick or the like, as shown by "d" in FIG. 27, the high clutch 50 is not engaged even at and after the time point t32 after the command for the shift-up to the fourth gear stage is output, and as shown by "e" in FIG. 27, the confirmation determination by the switching confirmation control is not performed. In this case, as shown by "f" in FIG. 27, in a period from the time point t32 until a time point t36 at which the command for turning off the first SV 101 for returning the second switching valve 116 to the first state is output, the low vehicle speed side condition is used as the third-fourth gear stage shift-up condition.

In a case where the malfunction of the second switching valve 116 is occurring, the low vehicle speed side condition is used even at and after the time point t32. Therefore, a timing t34 at which the command for the shift-up to the fourth gear stage is output after the command for the shift-down to the third gear stage is once output at the time point t33 becomes earlier than the timing t35 at which the command for the shift-up to the fourth gear stage is output when the normal condition is used. On this account, even when the shift-down to the first gear stage is mistakenly realized by the malfunction of the second switching valve 116, this shift-down is realized at a relatively low vehicle speed. Thus, the excessive rotation of the engine can be suppressed.

Without performing special abnormality diagnosis control for determining whether or not there is the malfunction of the second switching valve 116, the excessive rotation of the engine can be suppressed by changing the third-fourth gear stage shift-up condition as above. Therefore, even when the command for the shift-up to the fourth gear stage is output quickly to such a degree that a time for the abnormality diagnosis control cannot be secured at the second gear stage or the third gear stage, the excessive rotation of the engine can be surely suppressed.

Further, according to the control example shown in FIG. 27, in a period from when the confirmation determination by the switching confirmation control is performed (time point t32) until when the command for turning off the first SV 101 is output (time point t36), the normal gear change control can be performed based on the normal condition.

Furthermore, according to the control example shown in FIG. 27, in a case where: the confirmation determination by the switching confirmation control is once performed; the second switching valve 116 is returned to the first state thereafter; and whether or not the next switching to the second state is normally performed becomes unclear (time point t36), the third-fourth gear stage shift-up condition is returned from the normal condition to the low vehicle speed side condition. With this, the next command for the shift-up to the fourth gear stage is output at a relatively low vehicle speed. Therefore, even if the shift-down to the first gear stage is realized by the malfunction of the second switching valve 116 when the command for the shift-up to the fourth gear stage is output, the excessive rotation of the engine can be suppressed.

Embodiment 4

The configuration of an oil pressure circuit 600 of the automatic transmission according to Embodiment 4 of the present invention will be explained in reference to FIG. 28.

The oil pressure circuit 600 is the same in configuration as the oil pressure circuit 500 of the above embodiment except for portions which are related to the engagement and release of the LR brake 60. Therefore, explanations of components that are the same as those of the oil pressure circuit 500 are omitted, and the same reference signs as above are used in FIG. 28.

Figure 28:
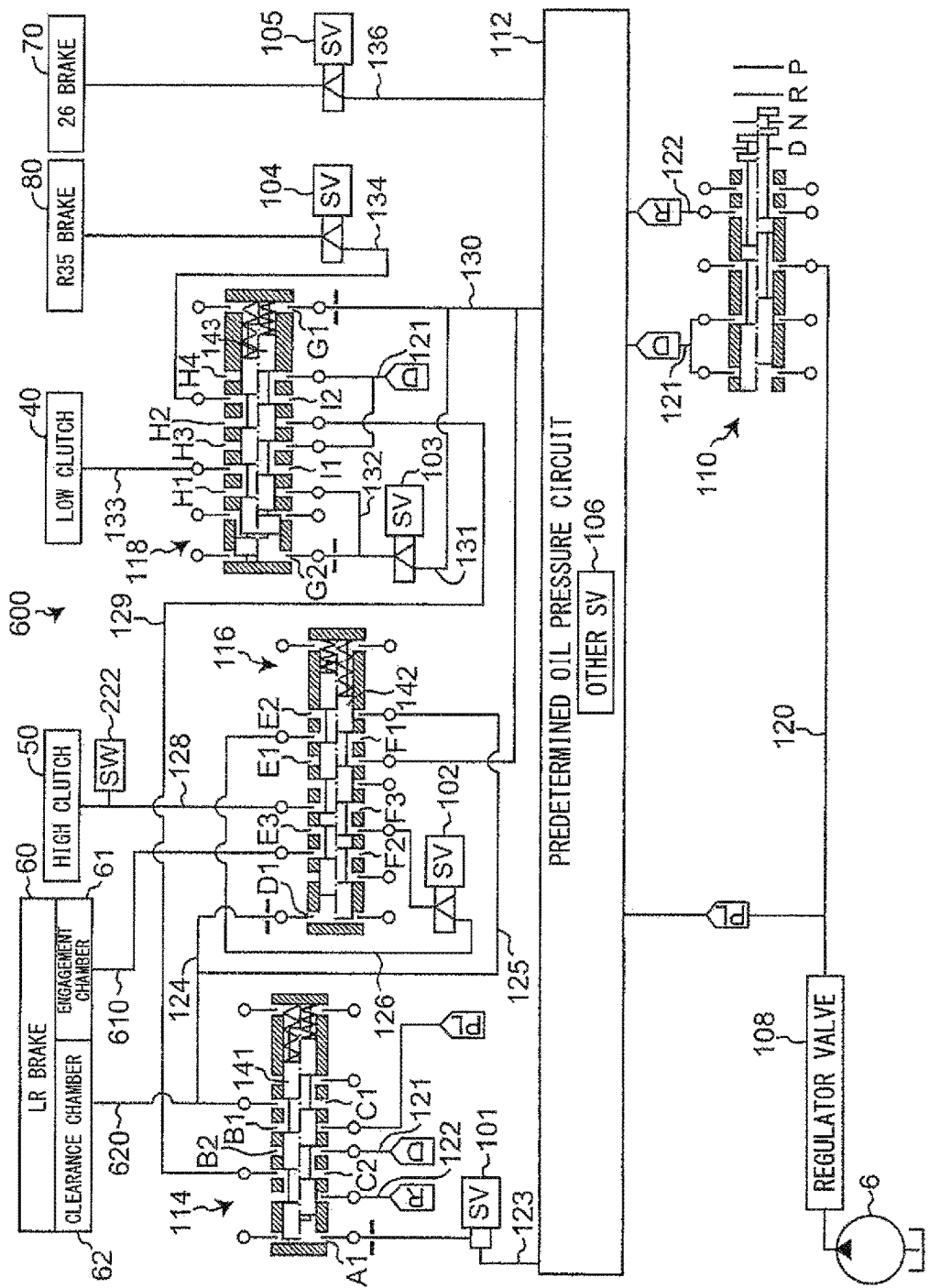
FIG. 28 is a circuit diagram showing the oil pressure circuit according to Embodiment 4 of the present invention.

In the embodiment shown in FIG. 28, a double acting type actuator (not shown) including an engagement piston and a gap adjustment piston is used as an oil pressure actuator of the LR brake 60, and the oil pressure circuit 600 is provided with a clearance chamber 62 and an engagement chamber 61. The clearance chamber 62 receives the supply of the oil pressure for causing the engagement piston together with the gap adjustment piston to perform a stroke to an engagement preparation position at which a small clearance state is realized. The engagement chamber 61 receives the supply of the oil pressure for engaging the LR brake 60 by operating the engagement piston located at the engagement preparation position.

The engagement chamber 61 is directly coupled to the output port F2 of the second switching valve 116 through a line 610, and the clearance chamber 62 is connected to the line 124 through a line 620, the line 124 being connected to the output port C1 of the first switching valve 114.

By turning off the first SV 101, the clearance chamber 62 is supplied with the line pressure through the line 124 and the line 620 from the output port C1 of the first switching valve 114 which is in the first state where the spool 141 is located at the left side. With this, the engagement piston performs a stroke to the engagement preparation position together with the gap adjustment piston and is maintained at the engagement preparation position.

As described above, when the first switching valve 114 is in the first state, the second switching valve 116 is in the first state where the spool 142 is located at the right side. Therefore, when the engagement piston is located at the engagement preparation position, the second switching valve 116 is in the first state. When the second SV 102 is opened in this state, the line pressure is input from the line 126 to the input port E3 of the second switching valve 116, and the line pressure is supplied from the output port F2 of the second switching valve 116 through the line 610 to the engagement chamber 61. With this, the engagement piston presses a friction plate to engage the LR brake 60.

As above, after the clearance is adjusted by the supply of the oil pressure to the clearance chamber 62, the engagement oil pressure is supplied to the engagement chamber 61. With this, the LR brake 60 can be engaged in the small clearance state. Therefore, regarding the LR brake 60 having a large capacity, engaging control that is accurate and excels in responsiveness can be realized.

On the other hand, when the LR brake 60 is in the released state, each of the engagement piston and the gap adjustment piston can be retreated to a position at which a large clearance state is realized. With this, the rotational resistance by the viscosity of the lubricating oil is suppressed.

Other than the above, the oil pressure circuit 600 is the same in configuration as the oil pressure circuit 500 of the above embodiment. Regarding forward gear stages equal to or higher than the second gear stage, the same gear change control as the above embodiment is performed.

Therefore, in the embodiment shown in FIG. 28, the third-fourth gear stage shift-up condition is suitably set in accordance with the gear change condition setting control depending on whether or not the confirmation determination by the switching confirmation control is performed. On this account, if the malfunction of the second switching valve 116 is occurring, the command for the shift-up from the third gear stage to the fourth gear stage is output quickly at a relatively low vehicle speed. Therefore, even if the erroneous shift-down to the first gear stage is realized, the excessive rotation of the engine can be suppressed.

The foregoing has explained the present invention using the above embodiments, but the present invention is not limited to the above embodiments.

For example, the above embodiment has explained a case where the third-fourth gear stage shift-up condition is changed to the low vehicle speed side. However, in the present invention, such change of the shift-up condition is also applicable to a shift-up condition between the other gear stages.

Further, Embodiments 1 to 4 above can be combined arbitrarily. For example, the automatic transmission 1 according to Embodiment 1 may be provided with the oil pressure switch 222, and the gear change condition setting control of Embodiment 3 may be performed.

Further, the switching confirmation control may be performed based on the result of the diagnosis in the abnormality diagnosis control. For example, when it is determined as a result of the abnormality diagnosis control in Embodiment 1 that the automatic transmission is normal (when each of the first switching valve 114 and the second switching valve 116 is normally switched), the switching confirmation control (the determination that the second switching valve 116 is normally switched to the second state) in Embodiment 3 may be performed.

INDUSTRIAL APPLICABILITY

As above, according to the present invention, even if an abnormality occurs in an oil pressure circuit of an automatic transmission, it is possible to avoid a case where a traveling performance deteriorates by the abnormality when gear change is performed. Therefore, the present invention may be suitably utilized in an industrial field of manufacturing automatic transmissions including oil pressure circuits and vehicles on which the automatic transmissions are mounted.

REFERENCE SIGNS LIST 1 automatic transmission
3 torque converter
3c turbine
3f lock-up clutch
4 input shaft
6 oil pump (oil pressure source)
40 low clutch
50 high clutch (second friction engaging element)
60 LR brake (first friction engaging element)
70 26 brake
80 R35 brake (predetermined friction engaging element)
100 oil pressure circuit (oil pressure control mechanism)
101 first solenoid valve
102 second solenoid valve (oil pressure control valve)
103 third solenoid valve
104 fourth solenoid valve
105 fifth solenoid valve
110 manual valve
114 first switching valve (switching valve)
116 second switching valve
118 third switching valve
144 normal oil pressure supply portion (oil pressure supply portion)
145 abnormality diagnosis oil pressure supply portion
200 control device
201 ECU
202 TCM
210 accelerator sensor
211 engine revolution sensor
212 vehicle speed sensor
213 range sensor
214 turbine revolution sensor
222 oil pressure switch
224 oil pressure switch
400 oil pressure circuit
500 oil pressure circuit
600 oil pressure circuit

The invention claimed is:

1. A control device of an automatic transmission mounted on a vehicle,
the control device comprising:
a predetermined friction engaging element;
an oil pressure supply portion configured to supply oil pressure to the predetermined friction engaging element at a predetermined change gear ratio;
an abnormality diagnosis oil pressure supply portion configured to supply the oil pressure to the predetermined friction engaging element through an oil pressure supply passage that is different from an oil pressure supply passage through which the oil pressure supply portion supplies the oil pressure to the predetermined friction engaging element; and
an abnormality diagnosis portion configured to switch from a normal state to an abnormality diagnosis state at the predetermined change gear ratio to diagnose whether or not there is an abnormality in the automatic transmission, the normal state being a state where the oil pressure supply portion supplies the oil pressure to the predetermined friction engaging element, the abnormality diagnosis state being a state where the abnormality diagnosis oil pressure supply portion supplies the oil pressure to the predetermined friction engaging element.

2. The control device according to claim 1, wherein:
in a case where the predetermined friction engaging element is maintained in an engaged state when the abnormality diagnosis portion switches from the normal state to abnormality diagnosis state, the abnormality diagnosis portion determines that the automatic transmission is normal; and
in a case where the predetermined friction engaging element becomes a released state when the abnormality diagnosis portion switches from the normal state to abnormality diagnosis state, the abnormality diagnosis portion determines that the automatic transmission is abnormal.

3. The control device according to claim 2, further comprising a torque reducing portion configured to reduce torque output from a power source of the vehicle to the automatic transmission when the abnormality diagnosis portion performs the diagnosis.

4. The control device according to claim 3, wherein the abnormality diagnosis oil pressure supply portion is related to supply of the oil pressure to a friction engaging element configured to be engaged at a change gear ratio close to the predetermined change gear ratio.

5. The control device according to claim 4, wherein the abnormality diagnosis oil pressure supply portion includes a switching valve configured to switch between an oil pressure supply state where the oil pressure is supplied to the friction engaging element configured to be engaged at the change gear ratio close to the predetermined change gear ratio and an oil pressure supply state where the oil pressure is supplied to a friction engaging element configured to be engaged at a change gear ratio different from the predetermined change gear ratio and the change gear ratio close to the predetermined change gear ratio, and therefore, the abnormality diagnosis oil pressure supply portion is related to the supply of the oil pressure to the friction engaging element configured to be engaged at the change gear ratio close to the predetermined change gear ratio.

6. The control device according to claim 1, further comprising:
a first friction engaging element configured to be engaged at a first change gear ratio;
a second friction engaging element configured to be engaged at a second change gear ratio smaller than the first change gear ratio;
an oil pressure control mechanism configured to be selectively switched between a first state and a second state, the first state being a state where the oil pressure is supplied to the first friction engaging element, the second state being a state where the oil pressure is supplied to the second friction engaging element;
a confirming portion configured to confirm that the oil pressure control mechanism is in the second state; and
a gear change condition setting portion configured to set a condition for shift-up to the second change gear ratio such that
when the confirming portion confirms that the oil pressure control mechanism is in the second state, a predetermined normal condition is used as a vehicle speed condition used when performing the shift-up to the second change gear ratio from a third change gear ratio which is higher than the second change gear ratio and at which the first and second friction engaging elements are released, and
when the confirming portion does not confirm that the oil pressure control mechanism is in the second state, a low vehicle speed condition that is set to a low vehicle speed side of the normal condition is used as the vehicle speed condition.

7. The control device according to claim 6, wherein:
the gear change condition setting portion sets the normal condition such that a vehicle speed condition when an acceleration request to the vehicle is larger than a predetermined amount is higher than a vehicle speed condition when the acceleration request is equal to or smaller than the predetermined amount; and
the gear change condition setting portion sets the low vehicle speed condition such that the vehicle speed condition when the acceleration request is larger than the predetermined amount is lower than the vehicle speed condition of the normal condition, and the vehicle speed condition when the acceleration request is equal to or smaller than the predetermined amount is equal to the vehicle speed condition of the normal condition.

8. The control device according to claim 7, wherein when the confirming portion confirms that the oil pressure control mechanism is in the second state, and the oil pressure control mechanism is switched from the second state to the first state, the gear change condition setting portion changes the vehicle speed condition from the normal condition to the low vehicle speed condition.

9. The control device according to claim 8, wherein the oil pressure control mechanism includes a switching valve configured to be switched to selectively supply the oil pressure to the first friction engaging element and the second friction engaging element.

10. The control device according to claim 9, wherein:
the oil pressure control mechanism includes an oil pressure control valve provided between the switching valve and an oil pressure source;
at the first change gear ratio and the second change gear ratio, the oil pressure control valve allows supply of the oil pressure from the oil pressure source to the switching valve; and
at the third change gear ratio, the oil pressure control valve blocks the supply of the oil pressure from the oil pressure source to the switching valve.

11. The control device according to claim 2, wherein the abnormality diagnosis oil pressure supply portion is related to supply of the oil pressure to a friction engaging element configured to be engaged at a change gear ratio close to the predetermined change gear ratio.

12. The control device according to claim 11, wherein the abnormality diagnosis oil pressure supply portion includes a switching valve configured to switch between an oil pressure supply state where the oil pressure is supplied to the friction engaging element configured to be engaged at the change gear ratio close to the predetermined change gear ratio and an oil pressure supply state where the oil pressure is supplied to a friction engaging element configured to be engaged at a change gear ratio different from the predetermined change gear ratio and the change gear ratio close to the predetermined change gear ratio, and therefore, the abnormality diagnosis oil pressure supply portion is related to the supply of the oil pressure to the friction engaging element configured to be engaged at the change gear ratio close to the predetermined change gear ratio.

13. The control device according to claim 7, wherein the oil pressure control mechanism includes a switching valve configured to be switched to selectively supply the oil pressure to the first friction engaging element and the second friction engaging element.

14. The control device according to claim 13, wherein:
the oil pressure control mechanism includes an oil pressure control valve provided between the switching valve and an oil pressure source;
at the first change gear ratio and the second change gear ratio, the oil pressure control valve allows supply of the oil pressure from the oil pressure source to the switching valve; and
at the third change gear ratio, the oil pressure control valve blocks the supply of the oil pressure from the oil pressure source to the switching valve.

15. The control device according to claim 6, wherein when the confirming portion confirms that the oil pressure control mechanism is in the second state, and the oil pressure control mechanism is switched from the second state to the first state, the gear change condition setting portion changes the vehicle speed condition from the normal condition to the low vehicle speed condition.

16. The control device according to claim 15, wherein the oil pressure control mechanism includes a switching valve configured to be switched to selectively supply the oil pressure to the first friction engaging element and the second friction engaging element.

17. The control device according to claim 16, wherein:
the oil pressure control mechanism includes an oil pressure control valve provided between the switching valve and an oil pressure source;

at the first change gear ratio and the second change gear ratio, the oil pressure control valve allows supply of the oil pressure from the oil pressure source to the switching valve; and at the third change gear ratio, the oil pressure control valve blocks the supply of the oil pressure from the oil pressure source to the switching valve.

18. The control device according to claim 6, wherein the oil pressure control mechanism includes a switching valve configured to be switched to selectively supply the oil pressure to the first friction engaging element and the second friction engaging element.

19. A method of controlling an automatic transmission, the automatic transmission comprising:
a predetermined friction engaging element; and
an oil pressure supply portion configured to supply oil pressure to the predetermined friction engaging element at a predetermined change gear ratio,
the method comprising
switching from a normal state to an abnormality diagnosis state at the predetermined change gear ratio to diagnose whether or not there is an abnormality in the automatic transmission, the normal state being a state where the oil pressure supply portion supplies the oil pressure to the predetermined friction engaging element, the abnormality diagnosis state being a state where an abnormality diagnosis oil pressure supply portion including an oil pressure supply passage different from an oil pressure supply passage of the oil pressure supply portion supplies the oil pressure to the predetermined friction engaging element.

20. The method according to claim 19, wherein the automatic transmission includes:
a first friction engaging element configured to be engaged at a first change gear ratio;
a second friction engaging element configured to be engaged at a second change gear ratio smaller than the first change gear ratio; and
an oil pressure control mechanism configured to be selectively switched between a first state and a second state, the first state being a state where the oil pressure is supplied to the first friction engaging element, the second state being a state where the oil pressure is supplied to the second friction engaging element,
the method comprising:
a confirming step of confirming whether or not the oil pressure control mechanism is in the second state; and
a gear change condition setting step of setting a condition for shift-up to the second change gear ratio such that
when it is confirmed in the confirming step that the oil pressure control mechanism is in the second state, a predetermined normal condition is used as a vehicle speed condition used when performing the shift-up to the second change gear ratio from a third change gear ratio which is higher than the second change gear ratio and at which the first and second friction engaging elements are released, and
when it is not confirmed in the confirming step that the oil pressure control mechanism is in the second state, a low vehicle speed condition that is set to a low vehicle speed side of the normal condition is used as the vehicle speed condition.

* * * * *